United States Patent
Tiutiunnik et al.

(10) Patent No.: US 11,430,211 B1
(45) Date of Patent: Aug. 30, 2022

(54) METHOD FOR CREATING AND DISPLAYING SOCIAL MEDIA CONTENT ASSOCIATED WITH REAL-WORLD OBJECTS OR PHENOMENA USING AUGMENTED REALITY

(71) Applicant: Zest Reality Media Inc., San Francisco, CA (US)

(72) Inventors: Pavel Tiutiunnik, Gomel (BY); Andrey Logvinenko, Gomel (BY)

(73) Assignee: Zest Reality Media, Inc., San Francisco, CA (US)

( * ) Notice: Subject to any disclaimer, the term of this patent is extended or adjusted under 35 U.S.C. 154(b) by 922 days.

(21) Appl. No.: 16/229,234

(22) Filed: Dec. 21, 2018

(51) Int. Cl.
| | |
|---|---|
| *G06V 20/20* | (2022.01) |
| *G06K 9/62* | (2022.01) |
| *G06Q 50/00* | (2012.01) |
| *H04W 4/02* | (2018.01) |
| *G06N 3/02* | (2006.01) |
| *G06T 19/00* | (2011.01) |
| *H04L 51/52* | (2022.01) |

(52) U.S. Cl.
CPC ........... *G06V 20/20* (2022.01); *G06K 9/6201* (2013.01); *G06N 3/02* (2013.01); *G06Q 50/01* (2013.01); *G06T 19/006* (2013.01); *H04L 51/32* (2013.01); *H04W 4/02* (2013.01)

(58) Field of Classification Search
CPC ........ G06V 20/20; G06K 9/6201; G06N 3/02; G06Q 50/01; G06T 19/006; H04L 51/32; H04W 4/02
USPC .......................................................... 382/311
See application file for complete search history.

(56) References Cited

U.S. PATENT DOCUMENTS

| | | | |
|---|---|---|---|
| 10,504,297 B2 * | 12/2019 | Cuthbertson | ......... A63F 13/792 |
| 2009/0037278 A1 * | 2/2009 | Cohen | .................... G06Q 40/12 |
| | | | 382/311 |

\* cited by examiner

*Primary Examiner* — Neil R McLean
(74) *Attorney, Agent, or Firm* — Bardmesser Law Group

(57) ABSTRACT

Method for creating by a user of a social media content represented as a message to be viewed in Augmented Reality. The invention presents a method of creation of social media content in association with a real-world object. With the use of this method, such social media content can be created by user, who is in proximity of a real-world object with which user wishes to associate with (add to) social media content, using a mobile device. The social media content thus created can be viewed by same user or other social media users by pointing a mobile device camera on the real-world object with which the social media content was associated with (added to). This is being achieved by implementing specific algorithm that uses Artificial Neural Network(s) for instant remembering, or identifying, visually distinctive real-world objects that had a social media content associated with (added to) it.

28 Claims, 14 Drawing Sheets

METHOD FOR CREATING AND DISPLAYING SOCIAL MEDIA CONTENT ASSOCIATED WITH REAL-WORLD OBJECTS OR PHENOMENA USING AUGMENTED REALITY

BACKGROUND OF THE INVENTION

Field of the Invention

The present invention relates generally to social media, and more particularly to the creation of the social media communication threads in an Augmented Reality that are associated with real-world objects.

Description of the Related Art

Nowadays social media are often used as the means for communication as well as the storage for files and messages. Various social media implementations provide useful search and navigation tools to help the users to find information on a certain subject that may be interesting, relevant, or very important to them. Unfortunately, such an information may be hard to access instantly because of the necessity to type, lack of keywords or phrases used by the user, or misspelling. There also can be the lack of means to address particular social media users who are interested in a very same subject. Alternatively, a user who possesses the information on a subject, and is willing to share it with those users to which it is important, can be currently unable to do so because he has no means to reach out to them other than those that also offer the information to a lot of users to which information on this given subject is not currently relevant. Described and other possible issues may conceal, or delay an access to, the useful social media information from the user of social media.

The present invention is aimed to overcome those issues. Namely, the invention makes it possible to avoid the inaccessibility of social media information relevant to a particular real-world object, connects users based on what objects they are interested in, improves user experience while communicating in social media, as well as increases communication effectiveness (for those purposes, a number of visually distinctive real-world phenomena can be utilized in the same way as objects).

On the other hand, there is currently a number of solutions available that allow users to view the information in a form of virtual objects by the means of Augmented Reality (or other technologies that are functionally similar in this case) in the proximity of the real world objects that can possibly be a subject to discussion within social media. However, none of those solutions can be practically used for communication of social media users related to a particular subject, for those solutions lack the combination of features that are required to do so: the capability for the user to create the content that is associated with a particular real-world object in real time and using a user mobile device only; the capability for multiple users to view the same virtual objects; the social media tools to engage in conversations with individual users and groups of users with a use of virtual objects.

The combination of those features and the unique capability to create virtual objects that are associated with very particular real-world objects, and will stay exactly there for other users to view and interact (which is made possible by the use of a specific algorithm that uses Artificial Neural Networks to remember and recognize particular real-world objects instantly, using resources of the mobile device) makes the present invention a practically usable tool for communication of social media users related to a particular subject, which cannot be achieved by use of any means that are currently present.

SUMMARY OF THE INVENTION

The present invention described herein relates generally to social media, and more particularly to the creation of social media communication threads in an augment reality that are connected to real-world objects.

The invention described herein presents a method of creation of social media content in association with (adding it to) a real-world object. With the use of this method, such social media content can be created by user, who is in proximity of a real-world object with which user wishes to associate with (add to) social media content, using a mobile device. The social media content, that was created in such a way, can be viewed by same user or other social media users by pointing a mobile device camera on the real-world object with which the social media content was associated with (added to). This is being achieved by implementing specific algorithm that uses Artificial Neural Network(s) for instant remembering, or identifying, visually distinctive real-world objects that had a social media content associated with (added to) it.

The invention described herein also presents a mobile device application that implements this method of creation of social media content in association with (adding it to) a real-world object. This mobile device application uses this method to provide for a user a social media tool that allows users to communicate with one another based on which visually distinctive real-world objects they are interested in. This mobile device application can use the means of Augmented Reality to better represent the social media content that is associated with (added to) particular visually distinctive real-world objects.

In an exemplary embodiment, a mobile device application that allows users to interact with the real-world objects, or phenomena, and with each other, and a method for creating by a user a of social media content represented in a form of a message that is to be viewed in Augmented Reality, and possible getting access to viewing, or in other way consuming, this social media content by this or another user, comprising the following stages creating by a user a social media content, wherein the following operations are performed capturing with a mobile device camera a placement frame containing, if possible, a visually distinctive real-world object, or phenomenon, by user; assigning a unique ID to the real-world object, or phenomenon, that was captured within a placement frame; creating a social media content in form of a message by user; associating the created social media content in a form of a message with the real-world object, or with adding content to the real-world object, or phenomenon, by binding the created social media content to the unique ID that was assigned previously to the real-world object, or phenomenon; detecting visual properties, and other properties that can be detected using the data from user device, of the real-world object, or phenomenon, that was captured within a placement frame, and storing the detected properties of the real-world object, or phenomenon, that was captured within a placement frame in association with the unique ID of the real-world object, or phenomenon, that was captured within a placement frame within a global database containing unique IDs and properties of different real-world objects, or phenomena; placing a social media content created by a user in a global social media content storage in association with the unique ID of the real-world object, or phenomenon, that was captured within a placement frame; getting access to viewing, or in other way consuming, this social media content by this or another user, wherein the following operations are performed pointing a mobile device camera on a real-world object, or phenomenon, that possibly has a social media content associated with it, or with attached to it, by a user, same or another one; capturing a real-world object, or phenomenon, that possibly has a social media content associated with it, or with attached to it, within a detecting frame with a mobile device camera by a user; by implementing a properties detection process, that is similar to a properties detection process used for detecting properties of the real-world object, or phenomenon, within a placement frame, detecting visual properties, and other properties that can be detected using the data from user device, of the real-world object, or phenomenon, that was captured within an access frame; identifying the real-worlds objects, or phenomena, captured in the access frame by comparing the detected properties of those objects, or phenomena, with the detected properties of real-world objects, or phenomena, that has social media content associated with it, or with attached to it, by users, from a global database containing unique IDs and properties of different real-world objects, or phenomena, and obtaining the unique ID of this real-world object, or phenomenon; extracting the social media content in a form of a message, that was associated earlier with obtained real-world object, or phenomenon, ID, from the global database; with a mobile device, displaying to the user the social media content in form of a message in a visual form that demonstrates the association of this social media content with a real-world object, or phenomenon, that was captured within the access frame.

Optionally, the social media content in a form of a message is being displayed as a visual representation of the message, and any content that is related to the message.

Optionally, the message is being displayed as a visual representation of the hyperlink to the message content.

Optionally, the message is being displayed as a visual representation of a media player of the message content.

Optionally, identifying the real-world object, or phenomenon, further comprises the steps of running an artificial neural network, that has several intermediate layers, utilizing primarily the mobile device processing means; using at least one of the placement or detecting frames, or at least one part of at least one of those frames, as an input for the object identification process that utilizes a neural network; using operating results of the artificial neural network intermediate layers as a properties data for social media content creating process; using operating results of the artificial neural network intermediate layers as a properties data for real-world object, or phenomenon, identification process.

Optionally, identifying the real-world object, or phenomenon, further comprises of detecting geolocation of the mobile device, collecting on the mobile device ID and properties of the objects, or phenomena, from the database within geolocation proximity, and detecting if the access frame, or frames which are used to display social media content, contain the real-world object, or phenomenon, that has an ID associated with it, and wherein a social media content that is displayed to a social media user is filtered by his or her proximity to real-world objects, or phenomena, that has social media content associated with it, or attached to it, with which social media content he or she interacted with previously, and geolocation of which matches, at least approximately, the geolocation of the object, or phenomenon, that is stored in the database.

Optionally, identifying the real-world object, or phenomenon, that has a social media content associated with it, or attached to it, with which a user can interact with, further comprises the steps of displaying the image captured by user mobile device camera on a user mobile device screen, or using other mobile device visual output system; searching the image captured by user mobile device camera for the area wherein the real-world object, or phenomenon, that has a social media content associated with it, or attached to it, is located; marking for user the area wherein the recognized real-world object, or phenomenon, is located.

Optionally, pointing out a particular real-world object, or phenomenon, or a real-world object, or phenomenon, fragment, that is to be processed for either social media content creation in association with it, or gaining access to a social media content that was associated with it, or attached to it, is being performed by tapping on a point on a mobile device screen inside this real-world object, or phenomenon, or real-world object, or phenomenon, fragment.

Optionally, highlighting a particular real-world object, or phenomenon, or a real-world object, or phenomenon, fragment, for a user is being fulfilled by any of the following additional steps drawing a line close to a shape of the real-world object, or phenomenon, on the mobile device screen; highlighting the screen area of the real-world object, or phenomenon; shadowing the screen area around the real-world object, or phenomenon; displaying the contrast borders of the real-world object, or phenomenon; placing a picture or a symbol above the real-world object, or phenomenon.

Optionally, the social media content contains a data attachment, or attachments, in any combination of following formats a text string; a text string in a rich text format; a video; an image; an audio; a text in a hypertext format; a hyperlink; a form of emoji-reaction; a file of any format.

Optionally, a social media tool provides an ability to receive an instant access to social media content directly or indirectly relevant to a particular, visually distinctive real-world object, or phenomenon, and/or an ability to interact with this content, a user who created this content, and/or users who have also interacted, and/or will interact, with this content, by pointing a mobile device camera on this real-world object, or phenomenon.

Optionally, a social media content has a form of a group messages for private communication, or game interactions, between users, wherein the message of one user is only visible to users from the same closed group of users, and the message of one user may be commented or updated by only users from the same closed group of users, and/or the user is able to join a conversation, thread, or a community, only by interacting with several real-world objects, or phenomena, or social media content that is associated with particular real-world objects, or phenomena.

Optionally, a user, using a user interface and a mobile device visual output system, interacts with other users that have also interacted, or will interact in the future, with a social media content or message associated with a particular real-world object, or phenomenon, by exchanging text comments, that may contain or not contain contents of other formats, including, but not limited to, emoji, images, animated images, audio, video, and/or attached files and wherein a social media user receives a status of community member by interacting with particular objects, or phenomena, that have social media content is associated with it, or attached to it.

Optionally, users form lasting communities based on similarities of real-world objects, or phenomena, or social media content associated with those particular real-world objects, or phenomena, that they interact with, and wherein users can form groups based on physical access to the same real-world objects, or phenomena, using a mobile device, and wherein an access to the group can be gained by interacting with a physical object, or phenomenon, from a limited distance using a mobile device.

Optionally, social media content or message that is being created by users stays visible and/or interactive for other users for a long period of time, and the period of time for which the social media content or message, that was created by users, stays visible and/or interactive depends on presence and/or frequency of user interactions with this particular content or message. The method further comprises defining time period and displaying the real-world objects, or phenomena, that have a social media content associated with it that had been created within the defined time period.

Optionally, the social media content or message that is being created by users is being displayed or not displayed to other users according to content display priorities that depend on content relevance, user preferences, user interactions, and/or other factors.

Optionally, a social media user is able to access a social media content that is relevant to a particular real-world object, or phenomenon, instantly by pointing a mobile device camera on this real-world object, or phenomenon, and wherein an augmented reality instance, associated with real-world objects, or phenomena, that is permanently accessible for multiple users to create, share, and view Augmented Reality content, is created; wherein a user can use interactions with real-world objects, or phenomena, for navigation through virtual content.

Optionally, an access to several pieces of social media that are, or can be, relevant to a particular real-world object, or phenomenon, is being offered to a user who points his/her mobile device camera on this real-world object, or phenomenon.

Optionally, a social media user is able to join a conversation, thread, or a community, by interacting with a particular real-world object, or phenomenon, or a social media content that is associated with a particular real-world object, or phenomenon.

Optionally, a social media content and/or social media content updates, and/or notifications that are related to social media content that is being displayed to a social media user, is being filtered by his/her proximity to particular real-world objects, or phenomena, with social media content associated with which his/her social network members with attached to which his/her social network members, and/or users who interacted with same social media content pieces he/she interacted with previously, interacted with, and wherein multiple Augmented Reality instances can be created for different groups of users.

Optionally, the method further comprises detecting geolocation of a user, that belong to a group of users that is related to a particular real-world object or phenomenon, and sending notification to the users in a case if the real-world object, or phenomenon, with the same, or approximately same, geolocation as the user has a message attached to it, or has been interacted otherwise, by another user, wherein the user who belongs to the same group.

Optionally, the method further comprises viewing social media content, that is associated with or with attached to the real-world object or phenomenon, outside the Augmented Reality, and frames on which social media content is displayed, are being demonstrated on the screen of a mobile device consequently in a form of video that portrays Augmented Reality; the method further comprises the step of navigation among real-world objects, or phenomena, and/or social media content associated with real-world objects, or phenomena, outside Augmented Reality, not using Augmented Reality, and the step of navigation among real-world objects, or phenomena, using the map representation of real-world objects, or phenomena, and/or social-media content associated with those objects, or phenomena, reflected on the map, and wherein messages that are associated with the objects, or with attached to the objects, or phenomena, if user opt so, are reflected on the image of the object, or phenomenon, geolocation even if the object, or phenomenon, is not currently visible to the user.

Optionally, a social media user gains functional and/or visual benefits, and/or cosmetic benefits, and/or privileges that are associated with being a person who had physical access to a particular real-world object, or phenomenon, that has a social media content associated with or with attached to, and that he can exercise, while using social media, or otherwise.

Optionally, a same social media content can be associated with multiple real-world objects, or phenomena, that are related to one another, visually resemblant, are parts of a single object, or phenomenon, are different states, and/or perspectives, of a single object, or phenomenon, and/or are forming a single scene.

Optionally, a user, when pointing a mobile device camera on a real-world object, or phenomenon, is being offered a choice between pieces of social media content that are, or can be, associated with this particular real-world object, or phenomenon, as well as real-world objects, or phenomena, in close proximity that are close to visual similarity or resemblance to this real-world object, or phenomenon, that a user points a mobile device camera at, wherein pieces of social media content that are being offered to a user are sorted by visual similarity or resemblance to the real-world object, or phenomenon, that a user points a mobile device camera at.

Optionally, a user can use interactions with real-world objects, or phenomena, for navigation through social media content, or other digital content.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 4 illustrates an example of Social Media that connects Social Media users based on matches of real-world objects they interact with.

DETAILED DESCRIPTION OF THE PREFERRED EMBODIMENTS

Reference will now be made in detail to the embodiments of the present invention, examples of which are illustrated in the accompanying drawings.

Figure 1:
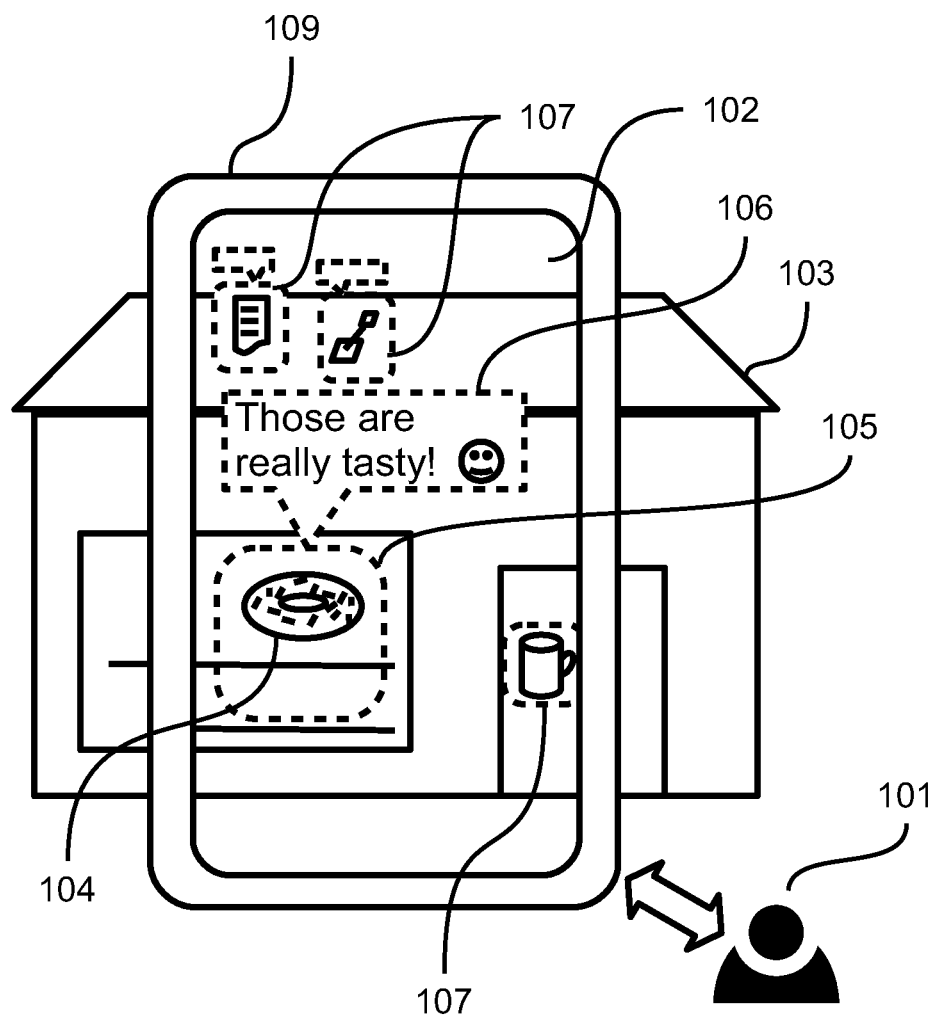
FIG. 1 illustrates an example of user-created messages attached to real-world objects, viewable via Augmented Reality.

In a particular case, FIG. 1 shows a user (computing) device 109, for example, a mobile device 59 (FIG. 13), at least one of the cameras of which is directed (at least, by one of Social Media users 101) towards an object of interest 103 (in particular capturing object of interest 103 within the camera view), in particular to a real-world object 104 (for those purposes, a number of visually distinctive real-world phenomena can be utilized in a same way as objects). An image recorded (captured) by the camera (in particular one which is in the field of view of the camera) of the user device 109 with a (Social Media) application 102 installed (in particular a mobile application 910, FIG. 9) is displayed on the screen of the user device. In a particular case, mentioned (mobile) application 102 is a Social Media application, in particular the Social Media mobile application intended for a mobile device. It should be noted that the camera of the user device 109 may operate (switch on/off, take pictures/video, switch between photo and video modes, etc.) using software installed and running on the user device 109, for example, using an application, firmware, operating system, etc. of mentioned user device 109, including using the application 102.

It should be noted that the object of interest may be at least one real-world object 104 and/or a part of such an object. For example, the object of interest may be a building, or an image/text/video/other objects of the real-world 104 located on, inside or near mentioned building, for example, flags, flowers, various devices (computing devices, etc., including those with display devices, such as monitors, TV sets, etc.), images on such objects, such as paintings, posters, etc.

It should be noted that the user device 109 may include or be connected to at least one camera, mentioned user device 109 being a smartphone, tablet, laptop, computer, single-board computer, augmented reality devices, such as augmented reality glasses, augmented reality headsets, etc., virtual reality devices, such as virtual reality glasses, virtual reality headsets, etc.), etc., and any combinations thereof, including those with peripheral devices, such as input devices, output devices, I/O devices, sound cards, network modules (cards), headsets, holographic glasses, smart glasses, HUD displays, additional devices (and accessories), for example, retaining devices intended for the user device 109, armchairs (chairs, costumes, etc.), for example, augmented, etc. reality (realities), etc.

Figure 8:
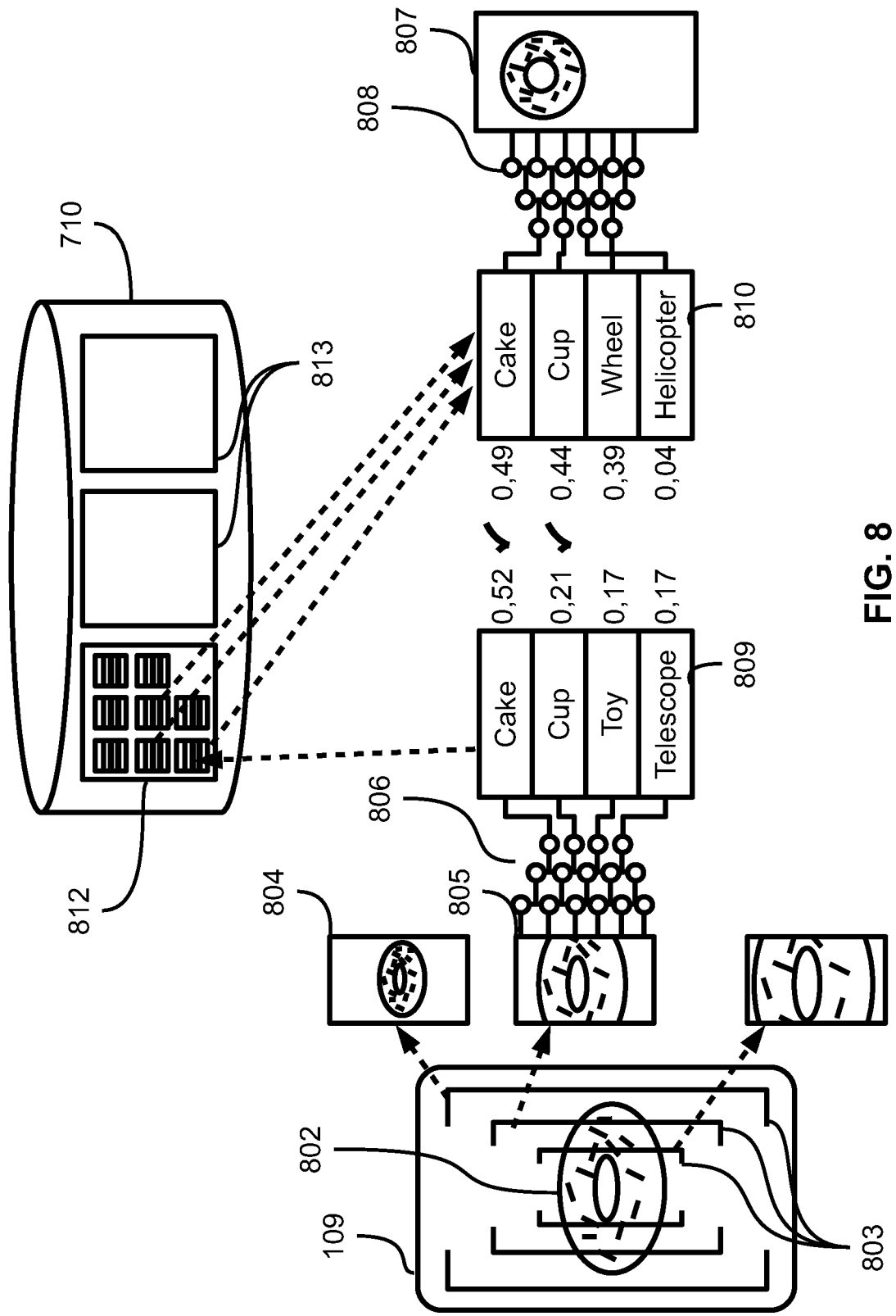
FIG. 8 shows an example of the technical process of object recognition case.

When at least one of the Social Media users 101 points the camera of the user device 109 at the object of interest 103, for example, at a building, at least one real-world object (including the building itself) 104 is processed, which is/was recorded by the camera of the user device 109 and/or by the modules of the user device, in particular by other sensors intended for scanning the real world, for example, by a sensor intended for measuring the distance to an object. The mentioned processing of an input data in form of a mobile device camera frame (or frames) utilizes artificial neural network (for acquiring similarities with a number of objects from a list of objects that this given artificial neural network had been taught to recognize), and results in forming digital identities of real-world objects captured within a camera frame. Those digital identities (IDs) can be either stored or compared (to identify real-world objects) with identities that are being stored. The mentioned processing can be performed solely by a mobile device efficiently enough for multiple frames per second can be processed, providing the real-time interactions with objects. An example of the mentioned processing is illustrated by FIG. 8. A Social media user can choose a real-world object to associate a message or social media content with and assigning at least one ID to a real world object are performed in a single step after a real-world object being chosen. A Social media user can, using a user interface and a user device visual output system, interact with other users that also interacted, or will interact in the future, with a social media content or message associated with a particular real-world object, by exchanging text comments or direct messages that may contain or not contain contents of other formats, including, but not limited to, emoji, images, animated images, audio, video, and/or attached files. Mentioned Social media content or message that is being created by Social media users can stay visible and/or interactive for other users for a long period of time and mentioned period of time for which social media content or message that was created by users stays visible and/or interactive depends on presence and/or frequency of user interactions with this particular content or message. Mentioned Social media content or message that is being created by Social media users can be displayed to other users according to content display priorities that depend on content relevance, user preferences, user interactions, and/or other factors. A Social media user is able to access a social media content that is relevant to a particular real-world object instantly by pointing a user device camera on this real-world object. Mentioned access to several pieces of social media that are relevant to a particular real-world object is being offered to a user who points his/her mobile device camera on this real-world object. A Social media user, when pointing a user device camera on a real-world object, is being offered a choice between pieces of social media content that is associated with real-world objects that are close to visual similarity or resemblance to the real-world object that a user points a user device camera at. Mentioned pieces of social media content that are being offered to a Social media user can be sorted by visual similarity or resemblance to the real-world object that a user points a mobile device camera at.

It should be noted that mentioned processing (or at least a portion of mentioned processing) can be performed on the side of the user device 109, including by using the software of the user device 109, in particular using at least one installed (and running) application, for example, the application 102. It should be also noted that mentioned processing (or at least a portion of mentioned processing) may be performed outside the user device 109, for example, at least on one server and/or a different user device, a user device of a different user, etc. In a particular case, the user device 109 is capable of transmitting data outward from the user device 109, for example, transmitting data to one of mentioned servers. It should be also noted that at least one portion of mentioned processing may be performed on the side of the user device 109, whereas the other portion of mentioned processing may be performed externally to the user device 109. Mentioned transmitted data may include messages, files (including, but not limited to, photos, video, audio), image (s), including photo- and video-images (in particular real time (online) photo- and video-images) recorded by the camera, data obtained a result of mentioned full and/or partial processing, and any other data (or at least a portion thereof) obtained by processing data from the camera of the user device or from different modules of the user device, for example, from sensors intended for scanning the outside world, mentioned data being converted using algorithms as described herein.

It should be noted that prior to mentioned processing, during or after mentioned processing, at least one Social Media user 101 of at least one user device 109 may add, to at least one real-world object 104, content, for example, at least one message, and/or content, reaction, including, for example, placement of a sticker that highlights the user's interest.

In a particular case, the camera of the user device 109 (including prior to, during or after mentioned processing) records (in particular catches) at least one of the real-world objects 104 (in particular one which gets caught by the camera lens (gets in the field of view); at least one real-world object 104) gets caught, to which at least one message may be added, for example, by a user, in particular using the (Social Media) application (102). For example, such a real-world object 104 may be a donut in a show window, for example, in the object of interest 103, or which is depicted on an advertising banner, which can be located (placed) on the object of interest 103, or an advertising booklet, or shown, for example, on a information visualization device (for example, on a display, monitor, TV screen, etc.), which, in a particular case, can be placed on the object of interest 103, etc.

In a particular case, the camera of the user device 109 captures, in the process of mentioned processing, at least one of the real-world objects 104 to which content has been added, for example, in a form of at least one message, for example, by the user of the (Social Media) application, for example, to a donut.

It should be noted that mentioned processing includes at least recognition of at least one object of interest 103, as (in the capacity of) at least one real-world object 104 with data added to it (associated with it) that was pre-stored, in particular by one of the users, by placing a tag. In a particular case, not only objects (and not just the objects themselves) can be recognized, but rather those objects to which data was added to (associated with) earlier (for example, by the user, system, system component, etc.) are recognized. During or after mentioned processing, the object of interest 103 is depicted on the screen of the user device 109 as a recognized real-world object 104. For example, a recognized object may be outlined by a frame 105. In a particular case, mentioned processing includes at least recognition of several objects, in particular sets of objects, sets of images on an object, components of an object, for example, windows, doors, sign boards, etc. In a particular case, the mobile application installed on the user device superimposes a new image on an object, wherein not only (in particular two-dimensional) image (video, animated image, etc.), but also a three-dimensional object (three-dimensional model) may be superimposed. In a particular case, the image is a flat image, which is a three-dimensional plane placed in space, i.e. the image is placed on a three-dimensional surface.

During or after mentioned processing, if at least one message was previously added to such real-world object 104, for example, by at least one user, application 102, on the server (by the server), etc., at least one user device and/or server, etc. displays such content associated with mentioned real-world object 104, in particular the message 106, on the screen of the user device 109.

Also information can be displayed on the screen of the user device 109 by means of the user device 109, for example, by the application 102, mentioned information being related to at least one mentioned message, added to at least one object (object of interest and/or real-world object), which is not recognized by the application at this moment, mentioned information may be further associated with the distance (to an object), the field of view (of the camera of the user device 109), priority of display of objects and/or other relevance factors, for example, object coordinates, content added to an object, including information associated with hashtags, object associations with other users, time of creation of an object tag, etc. Mentioned object display priority defines the need to display objects, the order of objects (displaying one object over another with full or partial overlapping, etc.), mentioned object display priority influencing the display of objects in the tag list (feed). It should be noted that the prioritizing algorithm is being executed on the server side, and different variants of it can be used depending on the options chosen (for example, the display priority can be computed based on the following parameters: creation time, distance, tag rating, and also tag associations with other users, or a combination of the above parameters).

In addition, visual elements 107 (in particular visual designation of tags) can be displayed that reflect the presence of tags in the direction in which the camera of the user device is being pointed, but the objects itself can not be caught by the camera at this moment (for example, they are located behind a wall, or they are too far to form an appropriate visualization thereof based on the camera images, for example, objects added from a distance of 2 meters and located 100 meters from the camera of a mobile device when searching) or could not be recognized using a mobile application.

Figure 2:
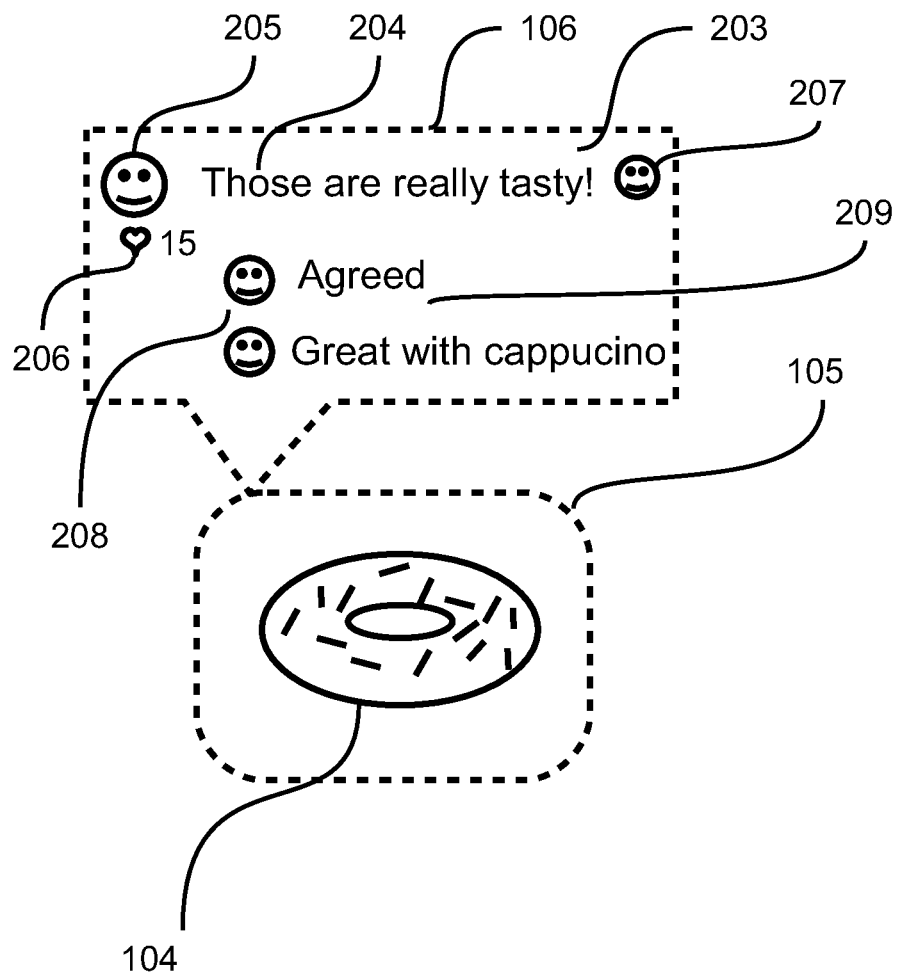
FIG. 2 illustrates an example of a user-created message attached to a real-world object as a Social Media content.

In a particular case, FIG. 2 shows the process of displaying, on the user device 109, an example of a tag that has been added to a real-world object 104 using the augmented reality means (technologies), with a social media content in form of a message associated with a real world object by Social Media user using the mentioned tag. In particular, FIG. 2 shows the visualization and functionality of such a message. The location of the real-world object 104 depicted on the user device 109 is outlined in FIG. 2 with a dashed frame 105. It should be noted that outlining the real-world object 104 can be performed either using the frame 105, or in any other fashion, for example, by contouring objects, shading, highlighting, or using other visual effects.

A message area 203, comprising messages associated with the real-world object 104, in particular added (by Social Media users), contains message text 204, in particular a text or image of at least one message. In a particular case, the message area 203 may be located above the object or on the object itself, or in other way visually related to the object. The message area 203 may contain an avatar of a Social Media user 205, for example, mentioned avatar may be an image, in particular a photo, a picture, video, etc., for example, a user photo (portrait, etc.), and may also be a symbolic avatar or an emoji-avatar. It should be noted that the avatar can be a graphical and/or textual presentation of the user, user's alter ego, game character, internet character, application user (for example, the user of the application 102), etc., wherein the avatar can be a two-dimensional (static or animated) image (for example, an icon) and/or a three-dimensional model, and/or text.

The message text 204 (including a comments, in particular the text of a comments) may contain emojis 207, and other types of Social Media content, such as video, links to web resources, stickers, etc., in particular the content implemented by means of images, animated images, video, etc. For example, the message text 204 may contain quantitative content, for example, "likes" count, a quantitative indicator 206 associated with user interactions, with at least one message in Social Media, in a particular case, in combination with interactive elements that allow the user of the application 102 to perform such (or similar) interactions. For example, mentioned interactive element can be the "like"/ "Join"/"Thanks"/"Stars" (content ranking)/"Report Spam/Abuse"/"Hide" buttons, etc.

The message area 203 may contain text(s), or text previews of comments from (other) Social Media users (209), in combination with avatars of (other) users and/or other (directly) associated information 208 (in particular meta-information/metadata), may be displayed (on the screen of the user device 109). It should be noted that the information 208 may be information associated with users and/or messages, and/or avatars, and/or comments, and/or real-world objects, and/or objects of interest, etc. Mentioned other (directly) associated information 208 may be user reactions, in particular implemented using emoji, stickers, "Thanks", or other functionally similar reactions or representations of user emotion or other message user wishes to communicate.

A user-created message that was added (in particular attached) to a real-world object and can be displayed together with the information 208, interactive elements, avatars, message text, comment text, quantitative indicators 206, emojis 207, etc. or with a different set of elements that in combination fulfills a similar role.

Figure 3:
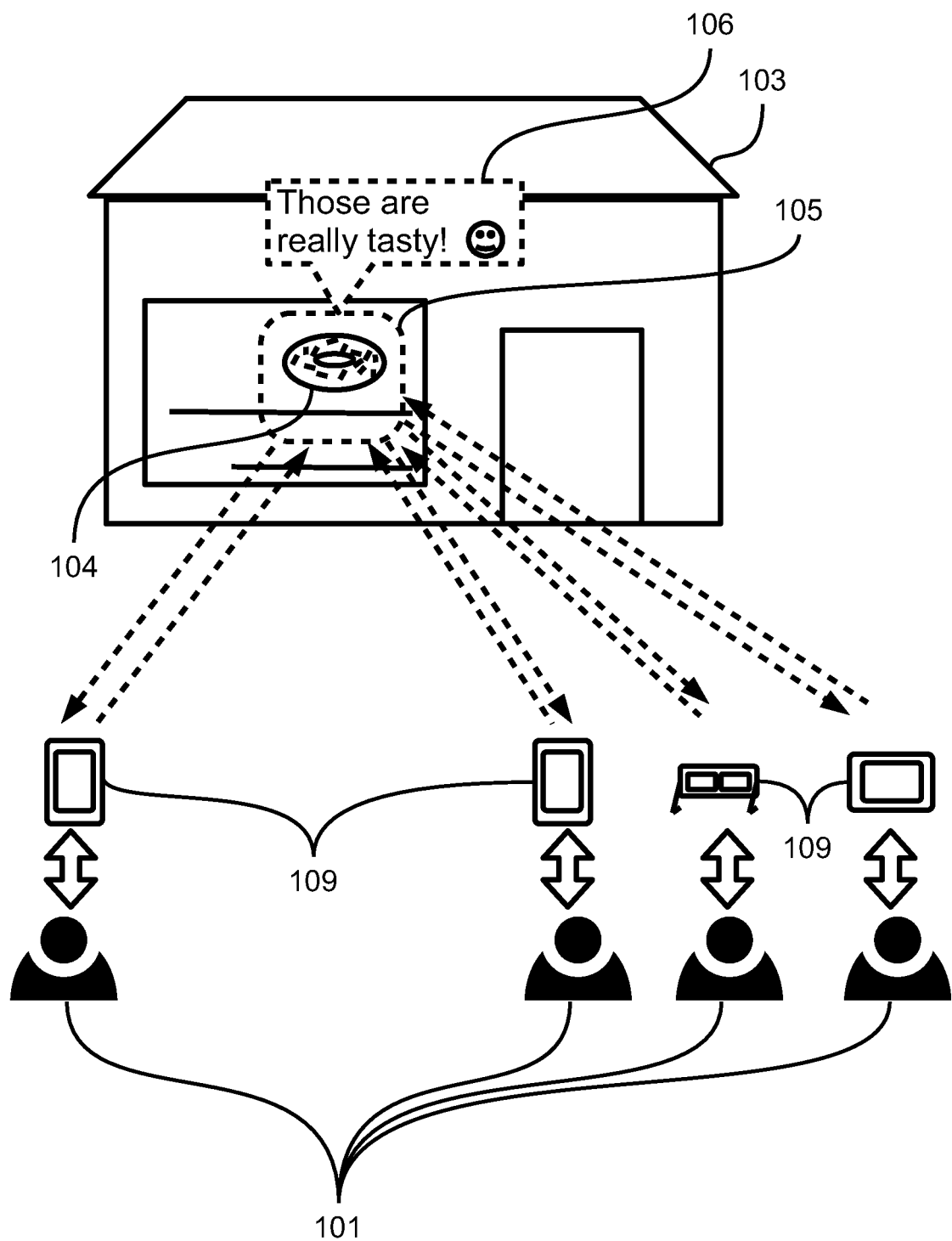
FIG. 3 illustrates an example of users view and interact with a message attached to a real-world object created by a Social Media user.

In a particular case, FIG. 3 shows an exemplary case of interaction of users using Social Media.

At least one of the Social Media users 101 has added to (associated with) a real-world object at least one message (related to this real-world object, or at least some of its attributes). After this, other Social Media users (which, in this particular case, do not differ from a Social Media user (101) who has added the mentioned message) can interact with such a message. It should be noted that mentioned interaction with the message by users may include viewing of mentioned message and comments from users associated with such messages, in particular with comments that users have added to such messages. Mentioned interactions of the users also include adding comments, joining user groups, adding ratings (for example, "likes", "thanks") and/or changing (and/or adding) other quantitative and/or qualitative parameters of messages or users in Social Media. Mentioned quantitative parameters may be a like, "Thanks", stars, etc. Mentioned qualitative parameters may be, for example, user rating, for example, expressed in numerical values or as Beginner, Expert, Guru, etc., related or not related to a particular subject or area of competence. Mentioned message can also be marked as important, informative, spam, advertising, etc.

It should be noted that mentioned interactions of the Social Media users (101) may include, for example, the use of at least one user device 109, and the use of at least one (specialized) Augmented Reality device (each of which or their combination is a special case of the user device 109). It should be noted that mentioned interactions of the users can be performed using the application 102 installed on the user devices (109), in a web browser, clients (client sides) of instant messaging systems, etc.

Figure 4:
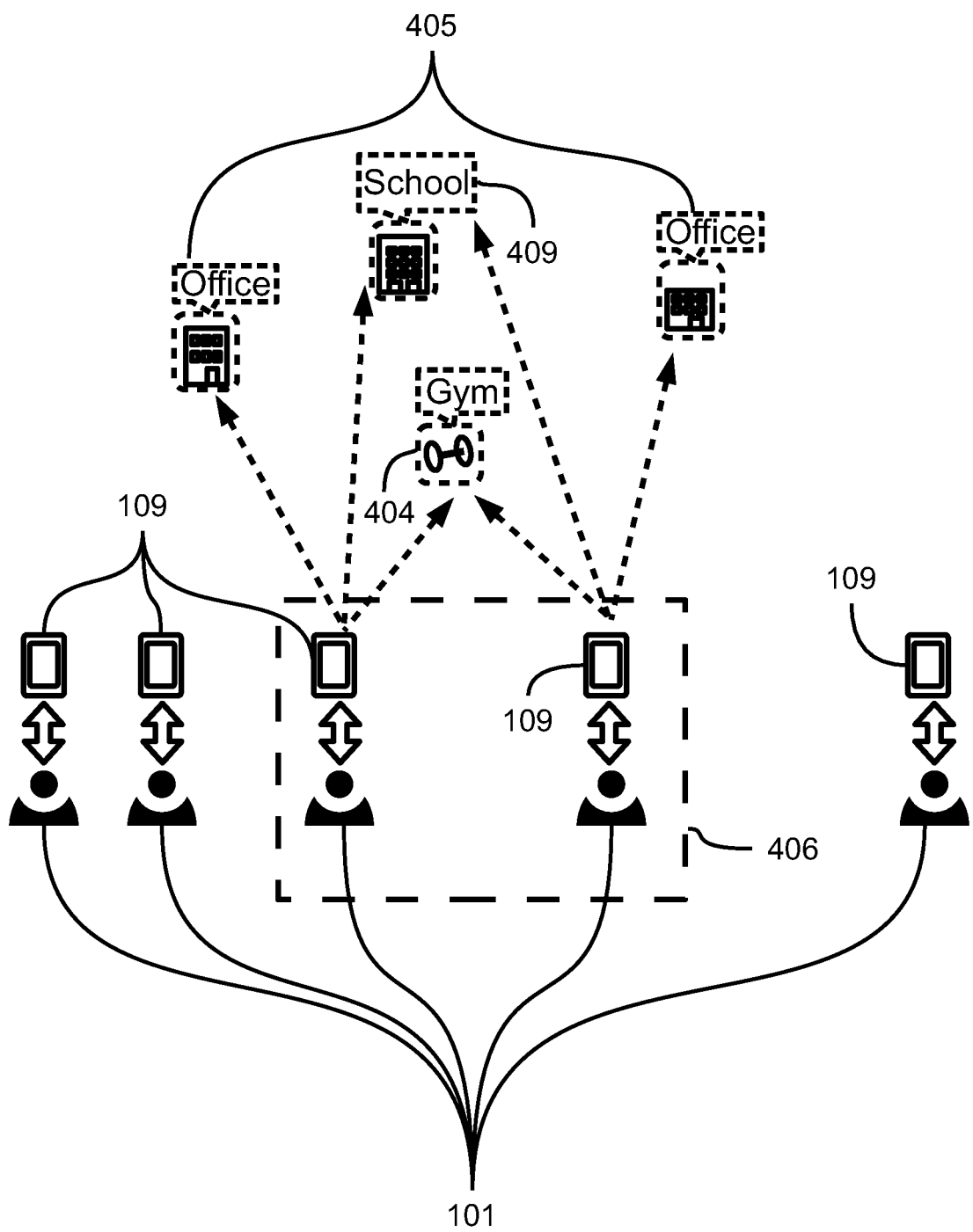

In a particular case, FIG. 4 shows an exemplary case of interaction of users, based on shared interests, with a use of a method of the present invention.

For example, if at least one Social Media user 101 who shares interests (in particular a set of interests), that are associated with particular real-world objects (based previous interactions with a use of Social Media), with at least one of the other Social Media users, then such users (or at least one user) can be associated with one another, in particular they can be included into at least one community (group) 406. Mentioned association (including) can be performed either by Social Media users manually, or automatically by means of the social media system that implements the method described herein, in particular by the server of such a system. Social media users can form lasting communities based on similarities of real world objects, or social media content associated with those particular real world objects, that they interact with. A social media user can receive a status of community member by interacting with a particular object that social media content is associated with. A social media user receives functional and/or visual benefits and/or privileges that are associated with being a person who had physical access to a particular real-world object that has a social media content associated with that he can exercise within. Social media users can form groups based on physical access to the same real world objects using a user device. Mentioned access to the group can be gained by interacting with a physical object from a limited distance using a mobile device.

For example, such an association of users with one another, in particular forming of a community (group), can be performed by the system described herein based on (or with or considering) the interests of the users that are being formed by interactions with social media content that was associated with (added to) at least one real-world object. The system described herein is able to prioritize social media content that is associated with (added to) real-world objects, and display on the user device, according to priorities, the content that is most interesting or relevant to the user, including data that describes real-world objects itselves, in particular images of such objects, locations of such objects, the distance between them and the user device, messages and/or users, etc., which are associated with mentioned object, in particular with a tag added to such an object (a real-world object and/or an object of interest). Social media connections of different level between users can be established, and communities of different level can be formed, based on how many interests the users 101 share (and also quantitative differences between social media content, that is associated with real-world objects, based on which content those interests are being identified).

In a particular case, the community is being formed after at least one subscription of at least one user for at least one different user, multiple users, social media content associated with (added to) a real-world object (or objects), hashtag, etc. For example, a user can join a social media content that is associated with (added to) real-world object, for example, a discussion, displayed on the user device. In a particular case, the interests that several users share that are related to real-world objects can be at least one gym, a gym network, gym attendance, a coffee shop, etc., or real-world objects that can be associated with any of those, or other objects. One of the users may visit the same establishment (gym, coffee shop, etc.), mentioned users can be relatives of each other (for example, children, wife, husband, father, mother, etc.), and so be engaged in separate social media interactions related to their family.

It should be noted that at least one user can interact (using own device 109 mentioned herein) with at least one object of interest, including one that is different from any of objects of interest of a different user. For example, one user can interact, using own device (109) mentioned herein, with other objects of interest. Such objects of interest may include various real-world objects, such as ones mentioned herein: offices (405), educational institutions, such as schools (409), gyms (404), a donut, etc. For example, at least one user (or at least a portion of users), can be combined in at least one (the one described above or a different) community (group) depending on the interactions of the users with mentioned objects, in particular since such objects are interesting (or may (potentially) be interesting (become interesting) to at least one user using the invention described herein, in particular a Social Media user).

Figure 5:
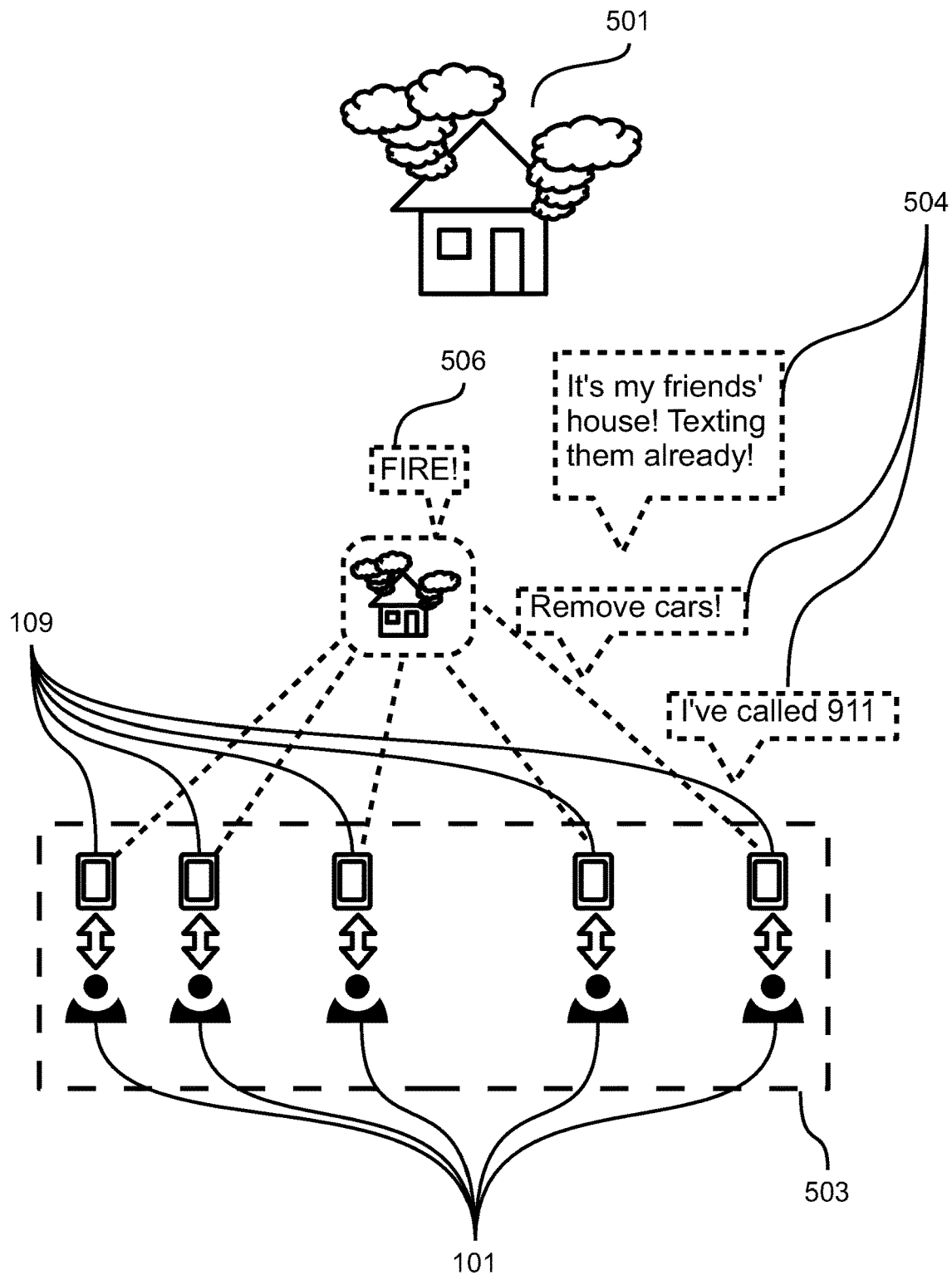
FIG. 5 illustrates an example of the real-time interaction between users of Social Media that happen to be nearby and are united by an event, point of interest, or phenomena.

In a particular case, FIG. 5 shows an example of the real-time interaction between users of Social Media that happen to be nearby and are united by an event, point of interest, or phenomena that can be related to a visually distinctive physical object directly or indirectly. When one of the users (one of the Social Media users) sees the object of interest 501, the user, by using the user device 109 mentioned herein, can create a social media content in form of a message 506, and associate it with the mentioned object of interest. The message 506 can be displayed on at least one device of at least one Social Media user (101), in particular containing important (to the users) information. After adding mentioned message 506, at least one of the users (in particular at least one different user) who, in a particular case, is located nearby mentioned object of interest 501, can (immediately) join the conversation (thread) by pointing the camera of the user device on the same object of interest 501. If the message associated with the object of interest (and/or the real-world object) is out of direct visibility for the user, the user is able to join the conversation (thread) by pointing the user device camera at the direction of the object of interest. To join the thread, the user may also find a message with a tag in the list of new or nearest threads, or in another list, in particular sorted by a certain criterion, for example, by the criterion of creation or interaction recency, proximity, relevance, presence of certain user hashtags, etc. As a result of several interactions as one described here, a temporary community 503 can be created, which includes users who either do or do not know each other personally or from previous social media interactions, in particular the community can be created based on an interest in the same object of interest, for example, the object of interest 501 or a phenomenon. A social media user is able to join a conversation, thread, or a community, by interacting with a particular or several real-world object, or a social media content that is associated with a particular real-world object. Mentioned real-world objects can be used to join a particular a conversation, thread, or a community, are connected by relevance, visual similarities, and/or similar category, or are connected by actions of users.

In this particular case, Social Media that utilizes the method described herein is able to provide a tool for users 101 to connect instantly. This connection is contextual and based on whatever real world object or phenomenon 501 does interest users 101 right now. Later users will be able to locate and access this social media content 506, making it possible to communicate with people who have shared a particular experience, to contact witnesses, etc.

The Social Media users can generate content, such as (text) messages, comments, emoji, images, videos or different media content, and can also share such content with different users, in particular with at least one community. It should be noted that the users can find at least one community and, in particular join such community, by searching for such a community by a keyword or hashtag. In a particular case, the hashtag can be a community-forming entity, i.e. (completely) determine the association of a tag to a community.

Figure 6:
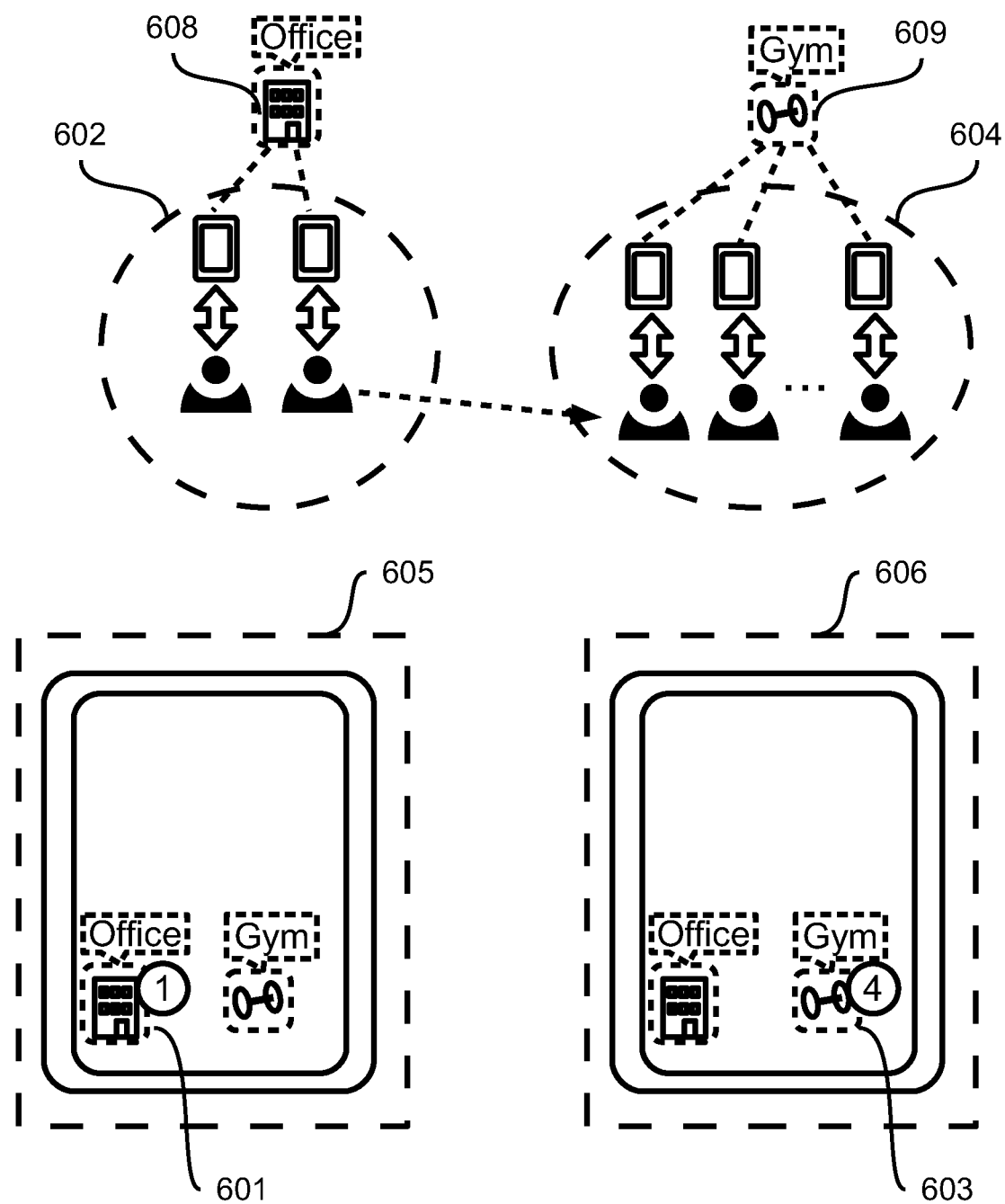
FIG. 6 illustrates an example of notifying Social Media users on approaching an object of interest, and filtering notifications on events.

In a particular case, FIG. 6 shows an example of notifying users (Social Media users) on approaching an object of interest, and filtering notifications on events, such as other users' interactions with social media content that was associated with (added to) real-world objects (698, 609), so that those notifications can be displayed to a user only (or primarily) when user physically comes into proximity areas (602, 604) of those objects. A social media content that is displayed to a social media user is filtered by his/her proximity to real-world objects, with which social media content pieces he/she interacted with, are associated with. A social media content that is displayed to a social media user is filtered by his/her proximity to real-world objects, with which social media content pieces his/her social network members, and/or users who interacted with same social media content pieces he/she interacted with previously, interacted with, are associated with. A social media user can receive notifications relevant to particular real-world objects based on proximity to those real-world objects, and is able to use real-world objects, and social media content that is associated with those real-world objects, as means for managing notifications. A Social media user can access social media content that he did not access previously at the time he/she approaches a real-world object that is associated with this social media content.

In particular, there can be a real-world object to which the message 601 was added. If a user enters the area (zone) of approach to the object of interest to which a message has been added, in particular with which (a message or object of interest) the user has interacted earlier (for example, such a message has been shown to the user earlier, the user added such a message (to the object of interest), the user left comments to such a message, etc., then updates (information) associated with such a message (and/or object of interest) are displayed to the user. In a particular case, the area of approach is determined using the geographical coordinates of the location of the user device, for example, using GPS and/or A-GPS, and/or a Wi-Fi signal or different network signal that allows to locate the user. Also, in a particular case, when the user device is located in a certain proximity to the object of interest (and/or real-world object), in particular in close geolocation, the area of approach is determined using a gyroscope and/or accelerator, using software development kit that allows for augmented reality applications to be built, for example, libraries for augmented reality, such as ARCore® (https://developers.google.com/ar/) and AR Kit libraries (https://developer.apple.com/arkit/), incorporated herein by reference or libraries having similar functionality. In a particular case, the area of approach is determined through the complex use of geolocation and location algorithms in augmented reality, including in rooms, and with the vertical movement of the user device. Mentioned updates, in a particular case, may be content, for example, content 504 (FIG. 5) from other users interacting (using the user devices) with such a message, object of interest, real-world object, etc., all updates (either the newest or selected by the server according to the relevance) from other users being displayed to the user, since the user's last interaction (using the user device) with such a message, object of interest, real-world object, etc.

In a particular case, at least one user receives mentioned updates (and/or notifications of such updates) to the user device while the user is in the proximity area 602. For example, if at least one user is in the proximity area 602, at least a message or notification of receipt, by the user, in particular by the user device, of such a message, which is a special case of the disclosed content (601), can be displayed (on the screen of the user device 109 (as shown by an element 605) to him or her, mentioned content being associated with the object of interest 608, for example, an office. When a user moves from the proximity area 602 to proximity area 604, at least a message or notification of receipt, by the user, in particular the user device, of such a message 603, can be displayed to him or her (as shown by element 606), mentioned content being associated with the object interest 609, for example, a gym.

It should be noted that the user can simultaneously be in several areas of approach, for example, in two proximity areas (602 and 604) in case such areas of approach overlap, messages or notifications of such messages informing of overlapping of several such areas of approach, in particular two proximity areas (602, 604), will be collectively displayed to the user.

It should be noted that the user can manually (for example, on the user device) configure update notifications, assign priority to messages, select update notifications shown when interacting with the user, which he or she wants or does not want to receive, regardless of the proximity to the object of interest (in particular being in the area of approach).

Figure 7:
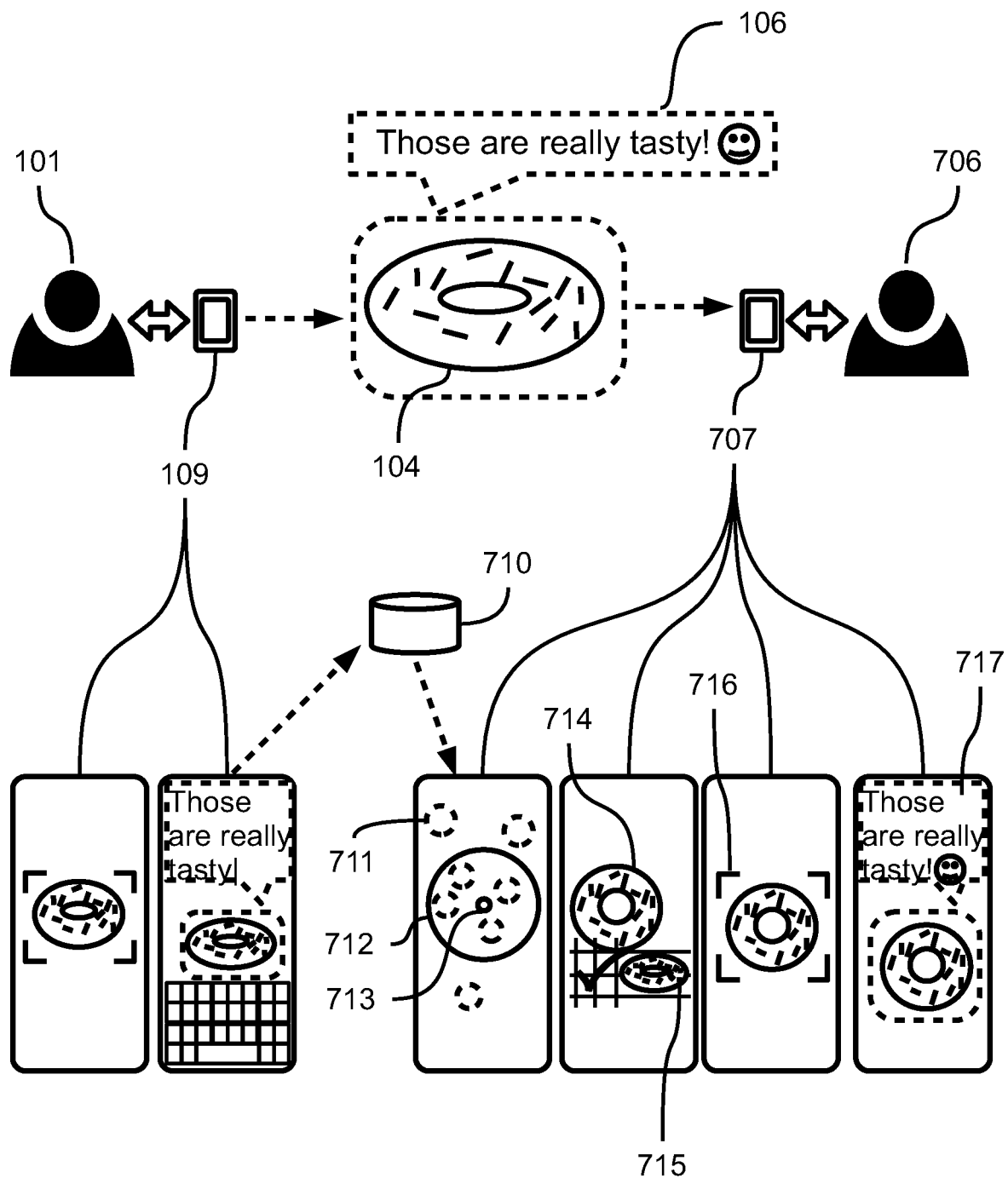
FIG. 7 illustrates an exemplary case of creating a social media content in form of a message, and associating it with a real-world object, and viewing such a message by Social Media users.

FIG. 7 shows an exemplary case of creating a social media content in form of a message, and associating it with (adding it to) an object of interest, for example, a real-world object, and viewing such a message by at least one of the users of the social media that uses the method described herein.

For example, at least one of the Social Media users (101) using the user device (109), in particular using the (mobile) application, associates (adds) a message he created 106 with an object of interest, in particular the real-world object 104, mentioned association (adding) being performed on the user device (109). It should be noted that a user may (using the camera of the user mobile device 109, or by other functionally similar means), for example, before directing, after directing, or when directing the camera of the user device (109), add content (for example, message text, image, video, audio, hyperlink, etc.), which can be added to (associated with) an object of interest, or in addition to at least one message added by at least one different user. In a particular case, the user can add content using search for an augmented reality tag, etc., to which new content will be added using the user device (109), mentioned tags can be found by criteria in a sorted list, for example, sorted by the distance to the augmented reality tags (in particular to real-world objects), by hashtags associated with the tag, by the date of creation of tags, etc.

It should be noted that, after selecting content, including a message, comment, etc., which will be associated with (added to) an object of interest, etc., the user can select an object of interest using the camera of his or her device, including focusing the camera of his or her user device on such an object. After confirming the addition of content, such as a message, etc. to an object of interest (in particular a real-world object), at least data, in particular metadata (for) such an object is transmitted, in particular is loaded into a real-world object identities storage 710 that stores such data and at least object identifiers (for real-world objects, objects of interest). Mentioned data, in particular metadata, is data that can be used to identify (with a predetermined identification reliability level) the tags of augmented reality and/or an object using the camera of the user device, in particular in an image created using the camera of the user device and, for example, stored in the user device memory. Such data, in particular metadata, can be arrays of numbers (vectors) obtained using ANN, or tags generated by computer vision algorithms. Furthermore, such mentioned data may be three-dimensional space descriptions obtained using algorithms that process data for display within Augmented Reality, in a particular case, such mentioned data returns software, such as software development kit that allows for augmented reality applications to be built (for example, ARCore®) and/or application programming interface (API) which lets developers build augmented reality applications, for example, with taking advantage of a device's camera, CPU, GPU, motion sensors, etc. (for example, AR Kit) and its format is specified by the libraries themselves.

It should be noted that at least one Social Media user (101, 706) can view mentioned content (in particular messages, etc.) added to at least one of mentioned objects by at least one user. It should be noted that the user 706 can interact with the message, for example, in order to interact with another user 101 of the same Social Media, in particular with the user who added the message, or with other users who interacted therewith, for example, viewed, commented, added content, etc., to such a content, and/or at least with one of the users who was present and/or will be present in the area of approach (for example, 602, 604, FIG. 6) and/or nearby (in particular in close proximity to) the object of interest, in particular the real-world object 104, to which at least one message was added. It should be noted that to view content, for example, messages, the Social Media user (101 or 706) directs the camera of his or her user device (109 or 707) towards mentioned object of interest (real-world object, etc.) or using other methods and means of interaction with the user device (109, 707), for example, by selecting content displayed on the user device. The mobile application installed on the user device (707) displays on the user device the message 106 attached to the real-world object 104. For example, the mobile application receives the geographic coordinates of the user device 707 and the user ID. The coordinates of the user device are used by the mobile application to determine the proximity zone (712). The proximity zone 712 is used for pre-filtering, by the user device, messages attached to real-world objects, wherein only those messages are selected which are within possible direct vision range or/and in close proximity to the user 706. Messages selected in this fashion are displayed to the user 706 by the mobile application of the user device 707, in case the mobile application recognizes the augmented reality tags to which mentioned messages were attached. If the user 706 gets within close proximity the real-world object 104 (or within object itself), the message 106 that was added to this real-world object by the another Social Media user 101 will be selected as one of the messages to be displayed provided that the user device 706 recognizes it using the mobile application installed on mentioned user device.

Messages associated with (added to) real-world objects that were not selected as being in close proximity 711 will not be displayed to the user 706 while user is attempting to identify real-world objects to which these messages were added. These messages will either be not displayed at all, or will be selected to be displayed using various filtering criteria, such as popularity, importance, relevance or previous user interactions with this message, with other messages or with other users.

The real-world objects 714 captured by the user device are compared with augmented reality tags that are being stored in a real-world object identities storage 710, mentioned tags being associated with (added to) real-world objects that are within a direct vision or/and in close proximity to the user 706. FIG. 8 illustrates the procedure for such comparison. The real-world object 714, which was recognized as a result of the comparison, can be outlined by a frame 716 or other visual means.

The user 706 can view the message 106 displayed on the screen of the user device 717, interact therewith and/or interact with other users who created it, interacted therewith or will interact therewith in the future, using a user interface of software installed on the user device 717.

Placement of mentioned tag (augmented reality tag) may include the following steps:
- Physical selection of the object of interest 104, which is to be used to add (augmented reality) tags, messages, which may contain or be a real-world object, etc., in particular an object of interest which at least one user can interact with using the user device, for example, add content, in particular a comment, for example, in the form of a message, description (or depiction) of an emotion, for example, symbolic description, leaving of an audio comment, etc.
- Launch of the mobile application 102 on the user device 109 by user;
- Pointing the camera of the user device by the user at the object of interest 104, wherein the user mobile application determines not only the visual content, but also attempts to determine the coordinates of the object of interest, in particular with a use of compass direction, meters above sea level, three-dimensional world description (for example, presence of surfaces), the location of a new tag compared with previously added tags (both to the same object of interest and/or the real-world object, and to other the real-world objects and/or objects of interest), for example, using gyroscope or locating, in particular by means of software, for example, augmented reality libraries, in particular provided that other tags were previously recognized using the user device;
- Creation of data (in particular metadata) for uploading to the server, in particular to the real-world object identities storage 710. The mobile application analyzes the quality of the data to add at least one tag, and, if necessary, notifies the user of the need to improve the quality of such data, for example, turn on geolocation, calibrate the compass by changing the user device orientation in space, move the user device to search for surfaces, for example, to use such data in ARCore®, ARKit recognition algorithms (used for particular implementation).
- The mobile application installed on the user device uploads mentioned data to the server, in particular to the real-world object identities storage 710, and uploads, together with mentioned data, at least one image, in particular original image, captured by the camera of the user device. Furthermore, the server, in particular the real-world object identities storage 710, processes the uploaded images, mentioned uploaded images being processed together with the corresponding (meta)data, for example, the server picks out data to determine the "old" versions of the mobile application, which may use a different ANN from that of the user device, in particular when placing tags, uploading images, etc., to provide backward compatibility.

Detection of mentioned tag (augmented reality tag) may include the following steps:
- The mobile application launched by the user authenticates the user, for example, in a hidden mode, for example, using a software library, for example, the Google® library-Firebase® (https://firebase.google.com/, incorporated herein by reference), and locates the user device, for example, comprising visualization 713 on the user device. The mobile application then transmits the user device's location data and user authentication data to the server, in particular for pre-filtering the real-world objects, proximity zones (712). For example, the server identifies the real-world objects that are in the proximity zones 712 and identifies the real-world objects that are in the proximity zones 711, in particular "discarding" those real-world objects (and/or objects of interest) that are not visible by the user or that are out of reach of the user 711, and not displaying social media content associated with it (added to it) to the user.
- At request from the mobile application, objects that can be "detected" (seen, identified) using the camera of the user device, are uploaded to the user device, in particular to the mobile application, from the server, in particular from the real-world object identities storage 710. For example, metadata is uploaded, in particular tags, real-world objects (and/or objects of interest), based on a proximity zone 712 in which they are located. For example, real-world objects can be uploaded, in particular identifiers thereof, images thereof, content thereof, messages thereof, etc. For example, data related to such real-world objects that are in close proximity to the (geographic) location of the user device, number of nearby objects (for example, 25), including data previously loaded for such objects, or data of such objects (or related to such objects, for example, all objects located not farther than 100 meters from the current location of the user device, or a plurality of such data, in particular criteria, may be uploaded, and, further, data (in particular criteria) of the relevance of objects for such a user may be uploaded to the user device, for example, depending on the user's interests, wherein the tags, being a portion of the data downloaded to the user device, may be associated with each other by social connections of the users with each other, in particular with other users with whom the user is connected, to whose device mentioned data is downloaded, the presence of hashtags, time of tag/message/content creation, etc.

The data received (including metadata) by the user device from the server is compared by the user device with the processed data from the camera of the user device, and the user device thereby determines the visibility of a certain object 714. Mentioned object is then marked for user as being found in any fashion, and content is then added thereto in augmented reality (715, 717). Thus, the added content can be outlining with a frame, placing, in the augmented reality, visual content including text content, over or on the object, or other visual effects.

The user can interact with mentioned (real-world) object, in particular react to the object, including interacting with content associated with such object, for example, adding "like", "thank", "reputation", joining the conversation, leaving a comment, rate, etc.

FIG. 8 shows an example of the technical process of object recognition case.

As a part of a process described herein, an artificial neural network (including a third-party general-purpose object recognition artificial neural network that had been taught to recognize a limited number of object categories) 806 is being utilized for object recognition (by the user device and/or server). The input of such neural network is supplied with images (804, 805) received from the camera of the device 109. FIG. 8 shows an image 802 of a real-world object (for example, 104, FIG. 1) to which the Social Media user (101, FIG. 1) can add (associate with) a social media content in form of, for example, a message. Every video frame "slice" can be processed by general purpose image classification Artificial Neural Network. The user device receives an image from the user device memory using a specialized algorithm (in particular the algorithm of conversion of a raster image used by the operating system (for example, RGB or YUV format) into a triplet color component array (RGB—red, green, blue) expressed in real numbers and used by the neural network). For example, obtaining at least one image of an object can be implemented by way of scaling of such an image obtained from the memory of the user device, in particular by enlarging the image 803. In the process of using the artificial neural network, the neural network provides a set of (abstract) attributes of an object 809 that are being generated from real-world object similarities with a number of objects from a list of objects that this given artificial neural network had been taught to recognize. Such a set of abstract attributes (corresponding to those utilized by inner classification process of an artificial neural network that is being used) is uploaded into the real-world object identities storage 710, where each object (812, 813) corresponds to an array of sets of attributes (taking into account different levels of scaling, different angles, lighting, object recognition steps, etc.). Similarities (visual associations) with multiple objects classifiable by Artificial said Neural Network are prioritized by confidence level and stored, creating a "Real World Identity Atom".

To recognize the object stored in the database, the reverse process is being applied, since the set of attributes 810 is obtained by an artificial neural network 808 when processing an image that contains a real-world object that is a recognition candidate 807. The resulting set of attributes 810 is compared with a set of attributes obtained earlier 809 and stored in the real-world object identities storage 710. At the viewer's side, a "Real World Identity Atom" is formed and compared with multitude of stored Atoms, matching similarities allowing to identify a marked object to display a message attached to it. The results of this comparison are being used by the software (for example, a mobile application), installed on the user device, in such a way that mentioned mobile application can decide whether the object with which a message was associated with (attached to) is present or not present within the field of view of the camera of the user device.

The mechanism of recognition of real-world objects includes detection of real-world objects in an image which uses the (specialized) ANNRecognizer program module.

Mentioned program module is being tasked with determining presence or absence of augmented reality tags located in the vicinity of the user device location. The server, using the location received, in particular the coordinates of the user device and other information, pre-selects tags associated with recognition candidates (tags that can be recognized at the moment by a particular user device). The input of the ANNRecognizer program module is supplied with an image from the user device and complex parameters from the sensors of the user device. Based on the information obtained, the ANNRecognizer program module determines a precise measure of probability of presence of each recognition candidate (a real-world object within the image. It should also be noted that, instead of object recognition, a more practical for social media use process of distinguishing real-world objects that has social media content associated with (attached to) it from one another can be utilized.

In a particular scenario, mentioned mechanism of recognition of real-world objects may include:

outlining the real-world object within an image stored in the user device memory. In a particular case, to obtain an object, a variety of algorithmic methods for obtaining an object are being used, in particular "cutting out" of a sub-frame as a percentage of the total frame, as described above. The targeting point is fixed on the screen (the point of fixing was calculated by the mobile application to be the most convenient for a particular screen resolution). The central parts of the image of several different sizes, for example, of 100%, 75%, 50%, and 25% of original image, are being cut-out for separate processing with a use of described algorithm to mitigate an effect that difference between a distance that user 101 who adds a content has to an object, and a distance that user 706 who wishes to access the content has to an object.

scaling the cut-out image to transmit an input data for the above network mentioned above. (Spline) interpolation of raster points can be used when scaling to small scales. Depending on the type of a neural network, image can be scaled in one of the appropriate resolutions used by the neural network, for example, 128× 128, 160×160, 240×240, or others.

checking at least one image, for example, by the user device and/or server, for availability of sufficient information, in particular meta information or a set of attributes obtained earlier 809 and stored in the real-world object identities storage 710, so that a tag can be added thereto. An algorithm for calculating the root-mean-square deviation is being applied during mentioned verifying. For example, in a particular case, the root-mean-square deviation of all differences between neighboring points in horizontal direction is calculated, and if mentioned deviation overcomes the threshold value, the image quality can be considered acceptable.

an image transmitted from the user device to the server is further supplied to the input of a neural network;

in a particular case, the neural network generates at least one intermediate layer (in particular at least one array of numbers) of artificial neural network execution results.

mentioned array of numbers (vector), in particular the array of real floating-point numbers is reduced to fixed-point numbers (in a particular case, provided that the basis is 256 bits, 24 bits are allocated for the integer part, whereas 8 bits are allocated for the fractional part), the constant equal to 256 is used as the basis;

the resulting array of numbers (and/or set of arrays of numbers) is compared with all arrays of numbers previously received from identity storage, and/or at least one array of numbers of an augmented reality tag.

mentioned comparison is performed in the same fashion as the hypothesis test with the Pearson correlation; to this end, the number array of numbers received from the server is considered the theoretical distribution law, whereas the camera data array of numbers is considered a sample for verification;

in a particular case, provided the coefficient of matching (Pearson's correlation criteria) is more than 0.65, the object is considered to be detected in an image;

in a particular case, when comparing several of the above cut-out images, the coordinates and size of the object on the user device screen can be (unambiguously) detected, the same applies to all objects found in this fashion;

the ANNRecognizer module generates quantitative conclusion about the matching of the object received from the camera with the object on the server. The operation is carried out in two stages: first, the match probability is calculated. Then, using the comparison with the coefficient, the decision on the exact match with the object is being made.

The information obtained in this fashion can be then used to maintain the object and change the object proportions.

Figure 9:
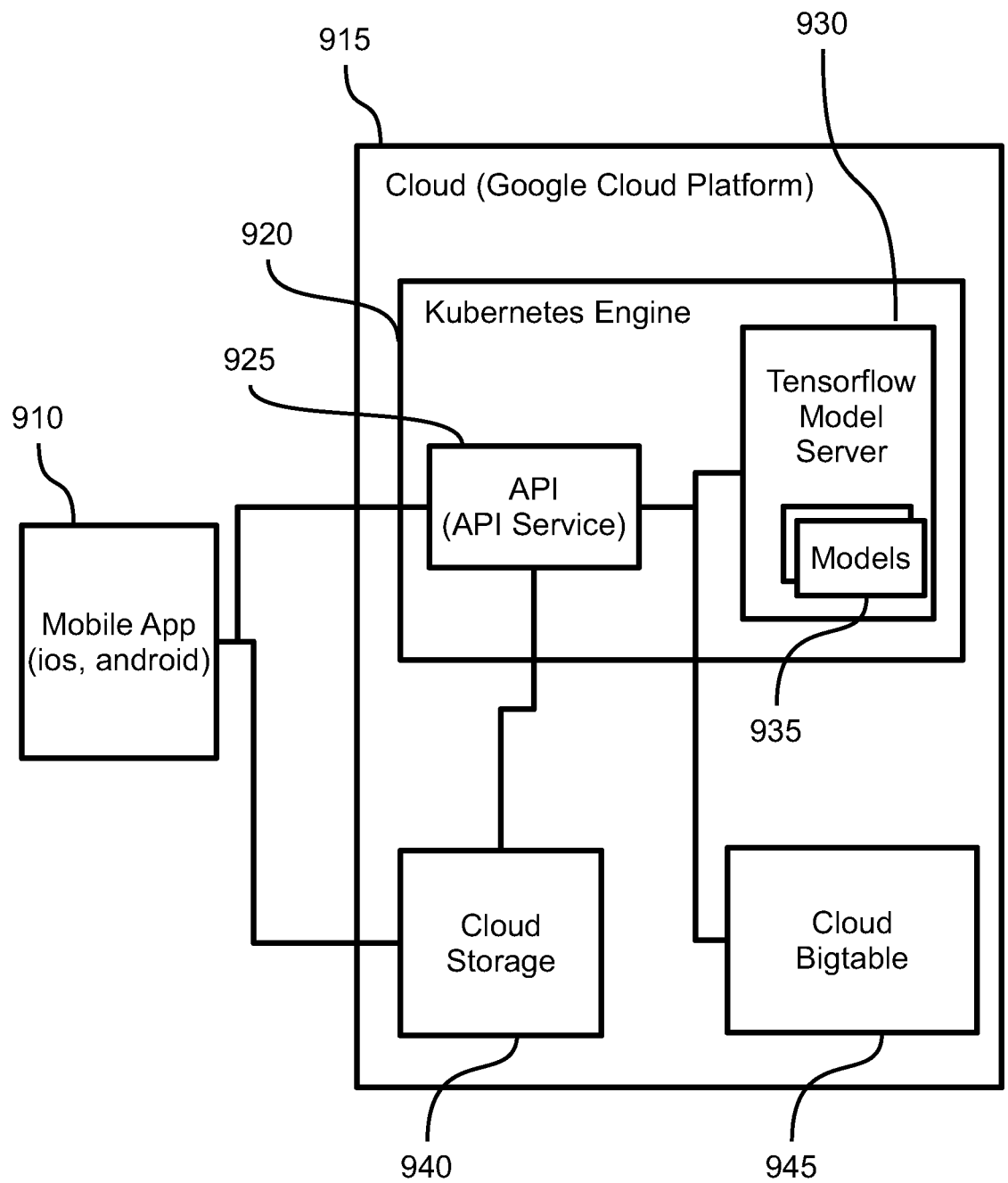
FIG. 9 shows an exemplary case of operating of the component parts of the server side of the system, which implements the method described herein.

FIG. 9 shows an exemplary case of operating of the component parts of the server side of the system, which implements the method described herein.

Mobile App (Mobile application) 910 uploads user created images (photos) to Cloud Storage 940 and requests API Service 925 to create and search marks and binded user content.

Cloud Platform 915 (such as Google Cloud Platform, https://cloud.google.com/, incorporated herein by reference)—a suite of cloud computing services (offered by Google®, used for particular implementation). It provides a set of management tools and series of modular cloud services used by application (Cloud Storage 940, Cloud Bigtable 945, Kubernetes Engine 920).

Kubernetes Engine 920—a managed container orchestration service for Kubernetes (an open-source container-orchestration system for automating deployment, scaling and management of containerized applications). Used for deployment and serving application containers (API Service 925, Tensorflow Model Server 930.

API (API Service) 925—a containerized application deployed with a use of Kubernetes Engine 920. API Service 925 acts as endpoint and expose API to Mobile App 910. It serve requests from Mobile App 910 to manage (create, update and delete) and search marks with different criterias. It requests Tensorflow Model Server 930 to extract feature arrays of numbers from images uploaded to Cloud Storage 940 by Mobile App 910.

Tensorflow Model Server 930—a containerized application deployed with Kubernetes Engine 920. It serves deployed machine learning models (Models) 935. Tensorflow Model Server 930 executes model(s) 935 on request from API Service 925 and returns model inference. Request defines model(s) 935 to be executed and image to be processed.

Models 935—machine learning models deployed to Tensorflow Model Server 930. Used to extract feature arrays of numbers from provided images.

Cloud Storage 940—online file storage web service for storing and accessing data on Google Cloud Platform 915 infrastructure. Used for uploaded images storage.

Cloud Bigtable 945—massively scalable NoSQL database on Google Cloud Platform 915 infrastructure. Used for storage and search of mark geolocation data, binded image feature arrays of numbers and user generated content.

Mobile Application 910 uploads original image to Cloud Storage 940.

Mobile Application 910 requests API, in particular API Service 925, to create mark for current location and uploaded image.

API Service 925 receives original image from Cloud Storage 940.

API Service 925 requests Tensorflow Model Server 930 for original image processing. Tensorflow Model Server 930 calculates feature arrays of numbers for all models 935 and returns them to API Service 925. Tensorflow Model Server 930 contains models 935 for all actual versions of Mobile Application 910.

API Service 925 saves feature array of numbers to Cloud Bigtable 945 with a reference to location.

Mobile Application 910 requests API Service 925 with a location.

API Service 925 searches Cloud Bigtable 945 for requested locations and returns found feature arrays of numbers to Mobile Application 910.

Figure 10:
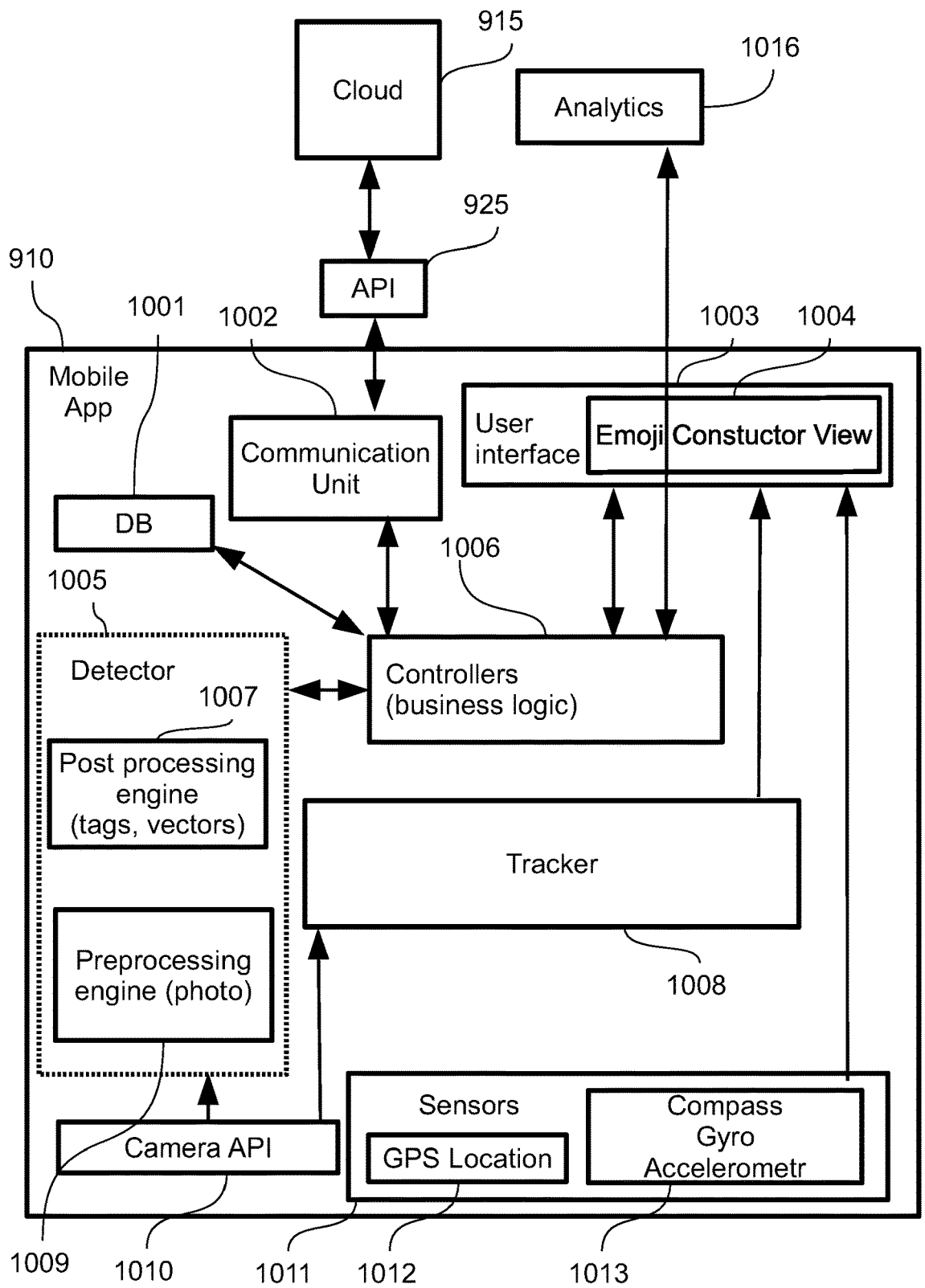
FIG. 10 shows an exemplary case of operating of the components of the described Social Media mobile application.

FIG. 10 shows an exemplary case of operating of the components of the Mobile Application 910.

The Mobile Application 910 is associated with the Cloud 915, in particular with Google Cloud Platform (used for particular implementation), using API (Application Programming Interface) 925, in particular the Mobile Application 910 connects to Cloud 915 via the API 925.

Cloud 915, in particular Google Cloud Platform, may include Kubernetes Engine 920.

Mobile Application 910 may include Communication unit 1002, which is a module intended for managing the cloud storage. API implementation for two server-side components: cloud storage of resources (StorageAPI, photos in different resolutions) and back-end (ServerAPI, for storage and management of all service entities). The server interaction protocol includes grpc+protobuf.

The Mobile Application 910 may include Analytics 1016, which is a module responsible for API analytics framework (Firebase® crashlytics, Firebase® analytics are being used for particular implementation).

The Mobile Application 910 may include Sensors 1011 which is a sensor scanning module of the user device; the module provides user location data (GPS Location 1012), in particular the user device location, and of user device orientation data (calculated on the basis of data from accelerometer, gyroscope and/or compass).

The Mobile Application 910 may include DataBase (DB) 1001 which is a local data cache, in particular ORMlite database (http://ormlite.com/), incorporated herein by reference, in particular for Android®, for storing service entities, an image file cache, RAM cache for the generated graphic resources (user avatars and tag icons).

The Mobile Application 910 may include Camera API 1010, which is a module for managing the camera of the user device, which provides a stream for displaying the camera image on User interface (UI) 1003, and also provides, with a certain periodicity, camera frames for a detector 1005 (ANN).

The Mobile Application 910 may include the User interface (UI) 1003 which, in a particular case, is a module that displays information to a user.

The Mobile Application 910 may include Controllers 1006 (business logic or the modules that manages communication between an end user interface and a database.) which may further include ArController 1103, CreateMarkCont 1107, MarksListCont 1106, ConversationCont 1112, ProfileCont 1110, MapCont 1114, which are described in more detail below.

The detector 1005 is ANN tag detection implementation.

Business Logic Module (Core) 1054, for the integration of all components.

Tracker 1008—the use of a computer vision engine is being developed for visualization of augmented reality. A tag visual representation bound to a real-world object recognized by the detector can be displayed on top of the camera image. Platform-specific frameworks can be used, for example, ARCore® and ARKit.

Figure 11:
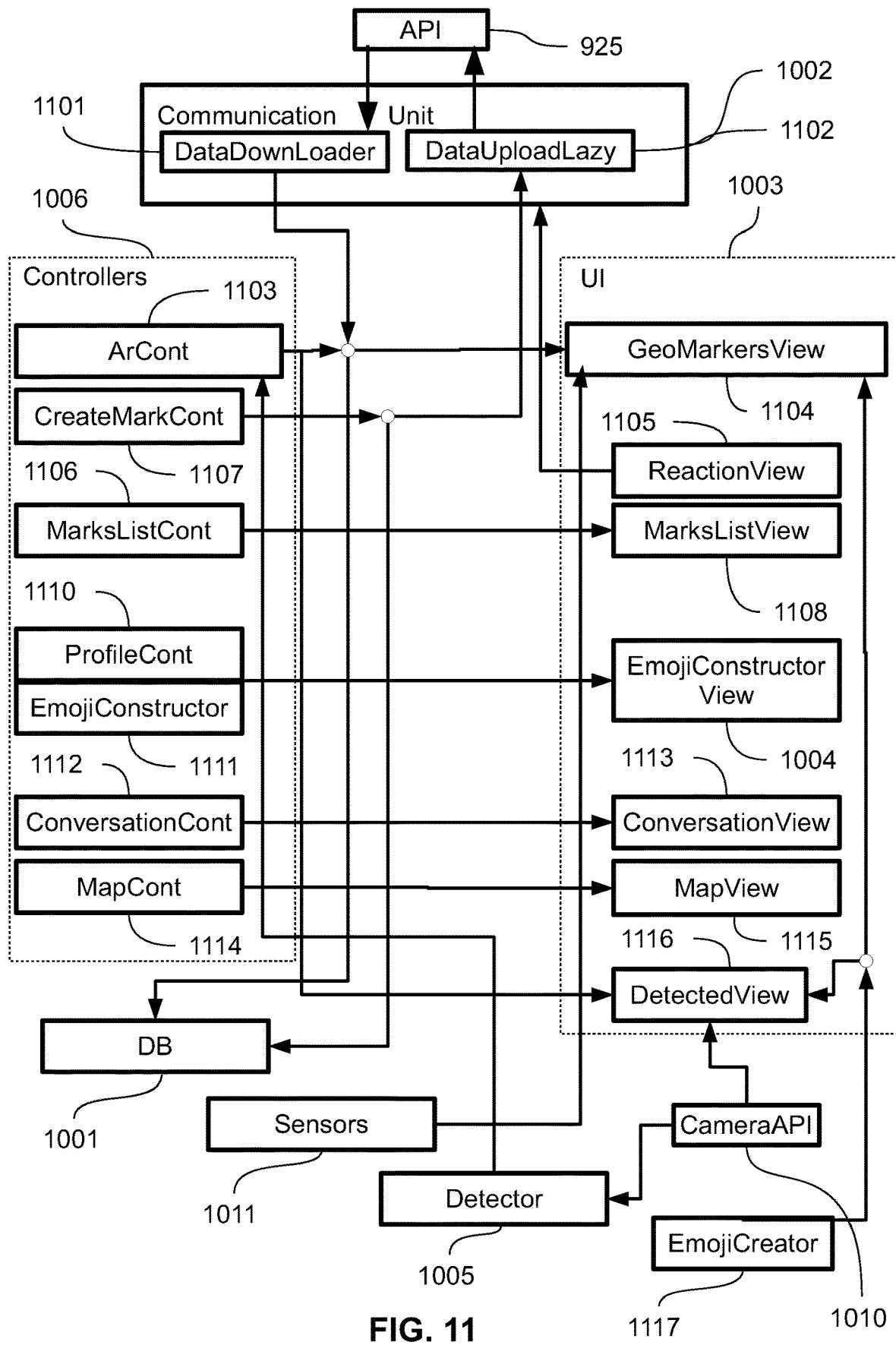
FIG. 11 shows an exemplary case of an architecture of the described Social Media mobile application.

FIG. 11 shows an exemplary case of an architecture of a mobile application that uses the method described herein. Communication unit 1002 includes DataUploaderLazy 1102 (FIG. 11) and DataDownloader 1101. DataUploaderLazy 1102 is module of delayed asynchronous upload of data to the server. The entities (tags with metadata), when generated, are saved in the local cache, and are then uploaded to the server side (in particular to the server) on a "first-come first-served" basis. DataUploaderLazy 1102 provides offline operation of the application, resume of uploading of data in case of unstable Internet connection, and repeats connection attempts in case of communication errors. DataDownloader 1101 is a module that provides downloading and updating data from the server for various filters, page-by-page downloading of data lists is also supported. An individual data loader is generated for each controller, and they operate independently.

The User interface (UI) 1003 includes GeoMarkersView 1104, DetectedView 1116, ReactionsView 1105, MarksListView 1108, ConversationView 1113, MapView 1115, Emoji creator 1117.

GeoMarkersView 1104 is a UI component for displaying tag icons over the camera image in connection to a geographical location, the GPS coordinates. The component receives data to display from ArController 1103, and orientation data from the Sensors module. The component implements augmented reality visualization for geo-tags.

DetectedView 1116 is a UI component that displays detector-recognized real-world objects that has tags associated with it, and a related data. The component displays all object variants that may be similar to the camera image and brief information on the tag selected.

ReactionsView 1105 is a UI component that displays the list of user "reactions" towards the tagged object ("reaction" refers to emotional display of a reaction in the form of an emoji or sticker, such as sad, delightful, etc.). The component allows to change the current reaction and choose a new one from the list. The reactions are displayed as a user avatar modified by a corresponding emotion.

MarksListView 1108 is a UI component for displaying tag lists. It displays brief information for each tag, reaction lists and popular comments from users.

ConversationView 1113 is a UI component that allows to comment, by a user, on a tag and implement conversations with a single level of nested comment.

MapView 1115 is a UI component that displays tags on the map (map service provider may vary from one platform to another, for example, Google® Maps can be used for this purpose).

Emoji creator 1117 is a UI component that allows to customize a user avatar using a combination of visual components (hairstyles, beards and accessories) and colors.

EmojiConstructor 1111 is a module for generating images of user avatars and customizable emoji. The module allows to assemble images from separate portions on several layers (for example, 20 layers). It also modifies the colour of certain graphic elements based on the user preferences.

ArController 1103 is an object recognition result display controller, and also a current location data downloading controller.

CreateMarkCont 1107 is a tag creation controller which allows adding a user reaction to a tag, and, optionally, a comment, and keywords (hashtags), to an object. It captures an object photo from the camera, generates data for recognition and adds to the queue data for uploading to the server.

MarksListCont 1106 is a controller for downloading tag lists for various filters and data display.

ConversationCont 1112 is a user dialog controller that manages data uploading and sending of added messages to the server.

ProfileCont 1110 is a user profile, registration and authentication controller, and also user data editing (name, avatar, etc.) controller.

MapCont 1114 is a map tag display controller.

Figure 12:
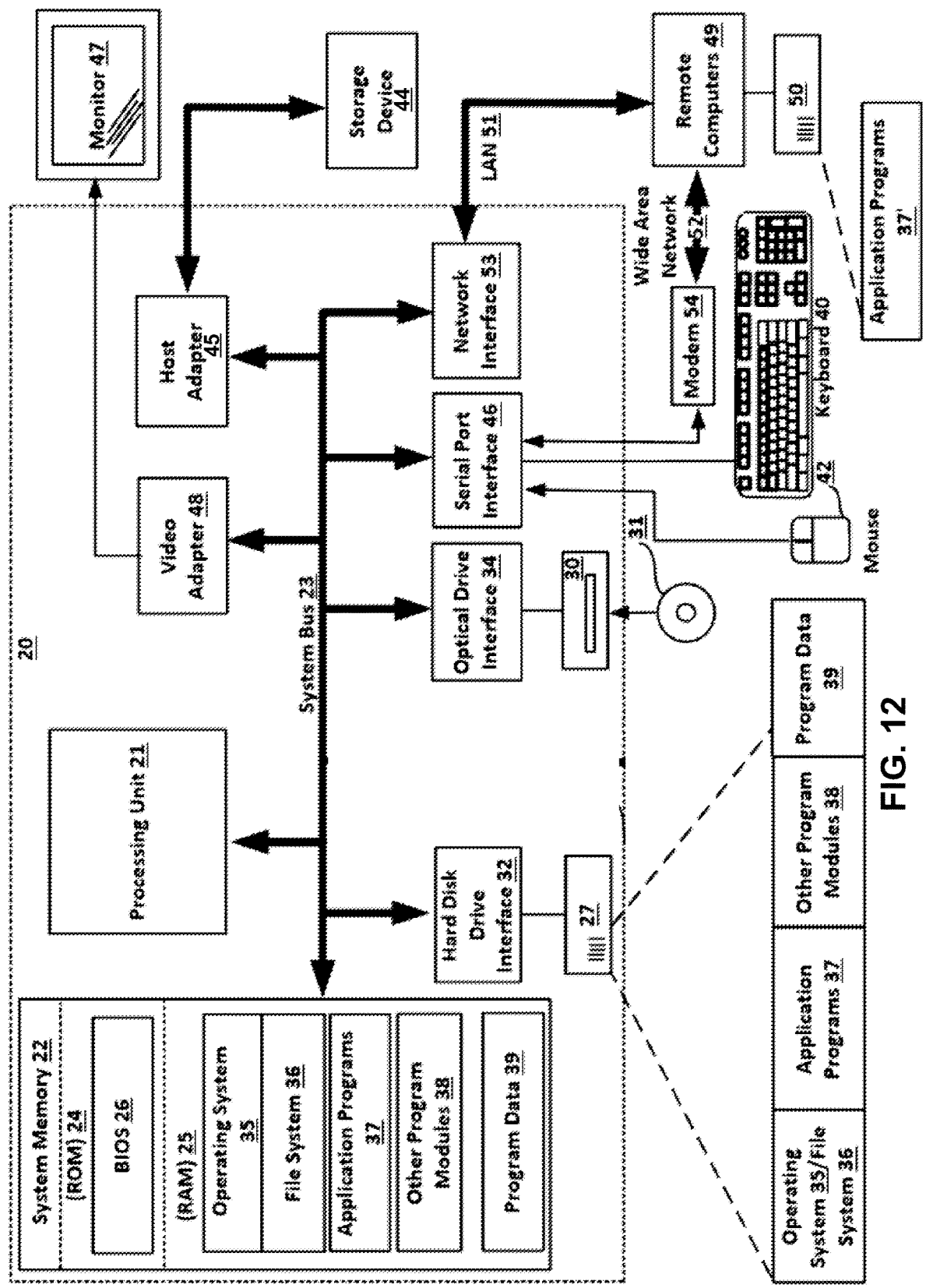
FIG. 12 illustrates a computer or server which can be used in the exemplary embodiment.

With reference to FIG. 12, an exemplary system for implementing the invention represents a general purpose computing device in the form of a computer or server 20 or the like, including a processing unit 21, a system memory 22, and a system bus 23 that couples various system components including the system memory to the processing unit 21. The device may be compiled from relatively small parts or components in form of mobile phone, the tablet or the like and represents user communication means.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, and an optical disk drive 30 for reading from or writing to a removable optical disk 31 such as a CD-ROM, DVD-ROM or other optical media. The hard disk drive 27, and optical disk drive 30 are connected to the system bus 23 by a hard disk drive interface 32, and an optical drive interface 34, respectively.

The drives and their associated computer-readable media provide non-volatile storage of computer readable instructions, data structures, program modules and other data for the server 20. Although the exemplary environment described herein employs a hard disk and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. Data storage device 44, such as a hard disk drive, a magnetic tape, or other type of storage device is also connected to the system bus 23 via an interface, such as a host adapter 45 via a connection interface, such as Integrated Drive Electronics (IDE), Advanced Technology Attachment (ATA), Ultra ATA, Small Computer System Interface (SCSI), SATA, Serial SCSI and the like.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Figure 13:
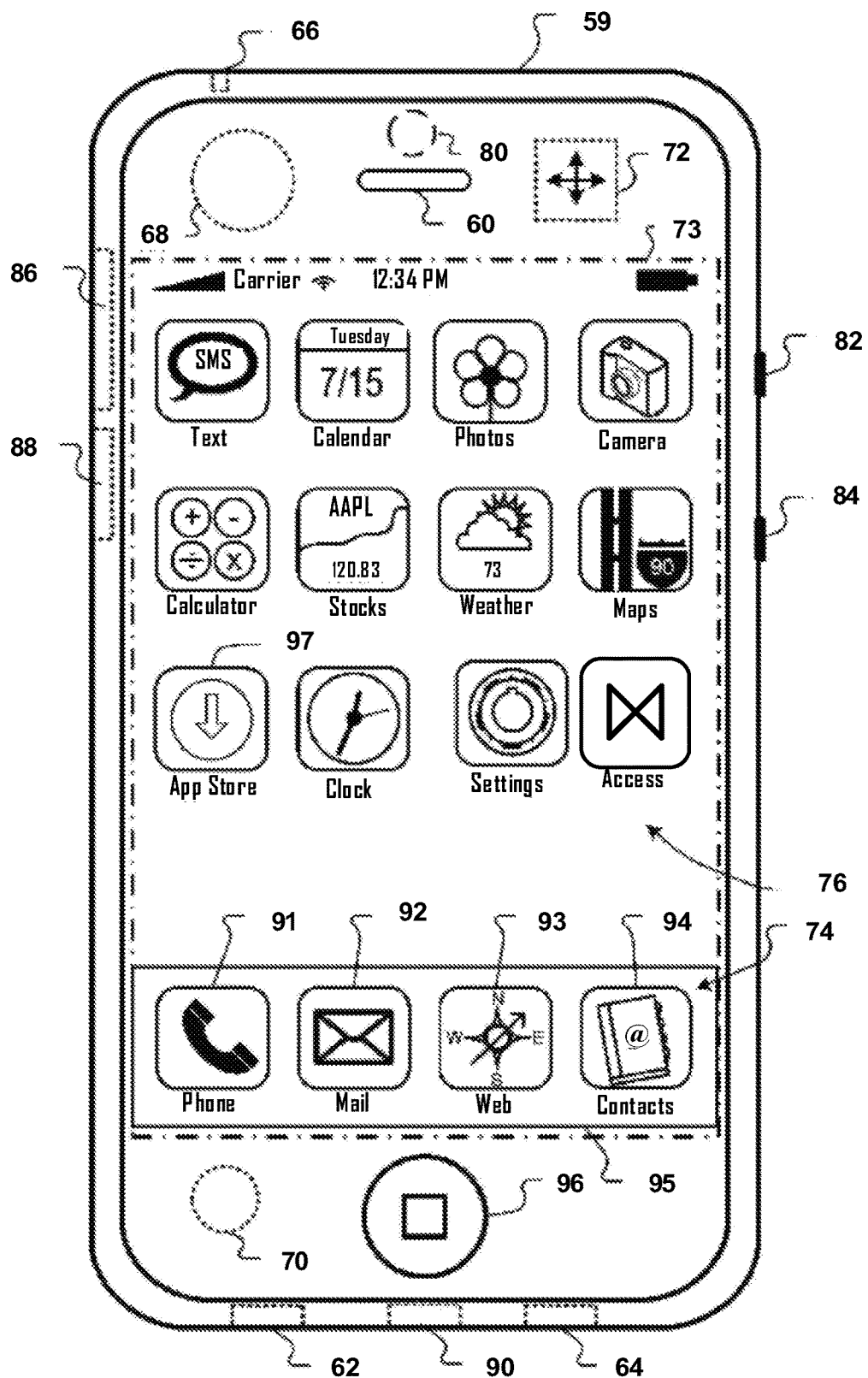
FIG. 13 is a block diagram of an exemplary mobile device that can be used in the invention.

FIG. 13 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a laptop, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to hectic and/or tactile contact with a user.

In some implementations, the touch-sensitive display 73 is a multi-touch-sensitive display. A multi-touch-sensitive display can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, the mobile device 59 can be configured as a base station for one or more devices. As such, the mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 14:
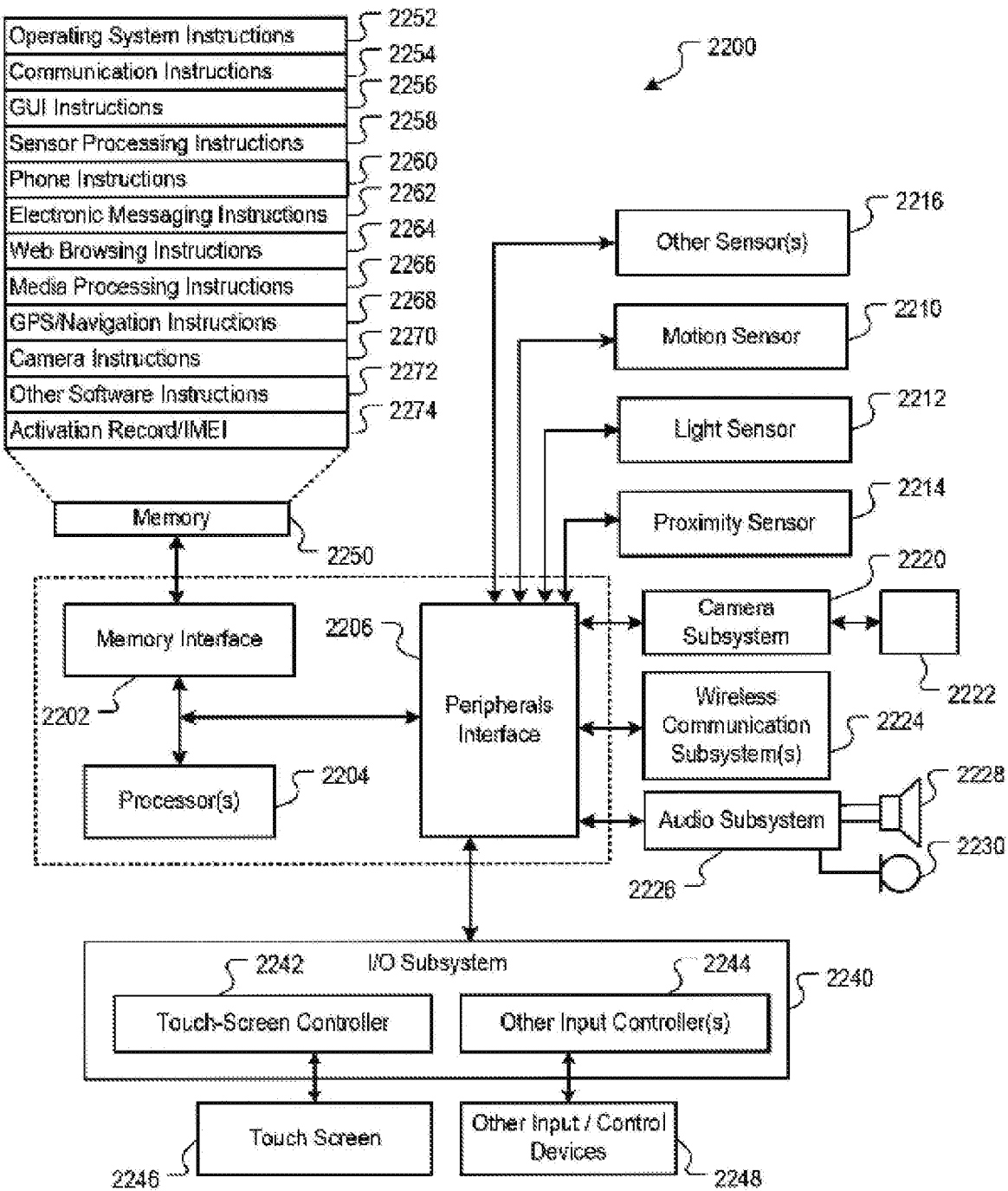
FIG. 14 is a block diagram of an exemplary implementation of the mobile device.

FIG. 14 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin®, RTXC, LINUX®, UNIX®, OS X®, ANDROID®, IOS®, WINDOWS®, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Those skilled in the art will appreciate that proposed system and method allow for effective advertising directed to the computer device users.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for creating by a user a of social media content represented in a form of a message that is to be viewed in Augmented Reality, and possible getting access to viewing, or in other way consuming, this social media content by this or another user, comprising the following stages:

creating by a user a social media content, wherein the following operations are performed:

capturing with a mobile device camera a placement frame containing, if possible, a visually distinctive real-world object, or phenomenon, by user;

assigning a unique ID to the real-world object, or phenomenon, that was captured within a placement frame;

creating a social media content in form of a message by user;

associating the created social media content in a form of a message with the real-world object, or with adding content to the real-world object, or phenomenon, by binding the created social media content to the unique ID that was assigned previously to the real-world object, or phenomenon;

detecting visual properties, and other properties that can be detected using the data from user device, of the real-world object, or phenomenon, that was captured within a placement frame, and storing the detected properties of the real-world object, or phenomenon, that was captured within a placement frame in association with the unique ID of the real-world object, or phenomenon, that was captured within a placement frame within a global database containing unique IDs and properties of different real-world objects, or phenomena;

placing a social media content created by a user in a global social media content storage in association with the unique ID of the real-world object, or phenomenon, that was captured within a placement frame;

getting access to viewing, or in other way consuming, this social media content by this or another user, wherein the following operations are performed:
- pointing a mobile device camera on a real-world object, or phenomenon, that possibly has a social media content associated with it, or with attached to it, by a user, same or another one;
- capturing a real-world object, or phenomenon, that possibly has a social media content associated with it, or with attached to it, within a detecting frame with a mobile device camera by a user;
- by implementing a properties detection process, that is similar to a properties detection process used for detecting properties of the real-world object, or phenomenon, within a placement frame, detecting visual properties, and other properties that can be detected using the data from user device, of the real-world object, or phenomenon, that was captured within an access frame;
- identifying the real-worlds objects, or phenomena, captured in the access frame by comparing the detected properties of those objects, or phenomena, with the detected properties of real-world objects, or phenomena, that has social media content associated with it, or with attached to it, by users, from a global database containing unique IDs and properties of different real-world objects, or phenomena, and obtaining the unique ID of this real-world object, or phenomenon;
- extracting the social media content in a form of a message, that was associated earlier with obtained real-world object, or phenomenon, ID, from the global database;
- with a mobile device, displaying to the user the social media content in form of a message in a visual form that demonstrates the association of this social media content with a real-world object, or phenomenon, that was captured within the access frame.

2. The method of claim 1 wherein the social media content in a form of a message is being displayed as a visual representation of the message, and any content that is related to the message.

3. The method of claim 2, wherein the message is being displayed as a visual representation of the hyperlink to the message content.

4. The method of claim 3, wherein the message is being displayed as a visual representation of a media player of the message content.

5. The method of claim 1, wherein identifying the real-world object, or phenomenon, further comprises the steps of:
- running an artificial neural network, that has several intermediate layers, utilizing primarily the mobile device processing means;
- using at least one of the placement or detecting frames, or at least one part of at least one of those frames, as an input for the object identification process that utilizes a neural network;
- using operating results of the artificial neural network intermediate layers as a properties data for social media content creating process;
- using operating results of the artificial neural network intermediate layers as a properties data for real-world object, or phenomenon, identification process.

6. The method of claim 5, wherein identifying the real-world object, or phenomenon, further comprises of detecting geolocation of the mobile device, collecting on the mobile device ID and properties of the objects, or phenomena, from the database within geolocation proximity, and detecting if the access frame, or frames which are used to display social media content, contain the real-world object, or phenomenon, that has an ID associated with it, and wherein a social media content that is displayed to a social media user is filtered by his or her proximity to real-world objects, or phenomena, that has social media content associated with it, or attached to it, with which social media content he or she interacted with previously, and geolocation of which matches, at least approximately, the geolocation of the object, or phenomenon, that is stored in the database.

7. The method of claim 1 wherein identifying the real-world object, or phenomenon, that has a social media content associated with it, or attached to it, with which a user can interact with, further comprises the steps of:
- displaying the image captured by user mobile device camera on a user mobile device screen, or using other mobile device visual output system;
- searching the image captured by user mobile device camera for the area wherein the real-world object, or phenomenon, that has a social media content associated with it, or attached to it, is located;
- marking for user the area wherein the recognized real-world object, or phenomenon, is located.

8. The method of claim 7, wherein pointing out a particular real-world object, or phenomenon, or a real-world object, or phenomenon, fragment, that is to be processed for either social media content creation in association with it, or gaining access to a social media content that was associated with it, or attached to it, is being performed by tapping on a point on a mobile device screen inside this real-world object, or phenomenon, or real-world object, or phenomenon, fragment.

9. The method of claim 7, wherein highlighting a particular real-world object, or phenomenon, or a real-world object, or phenomenon, fragment, for a user is being fulfilled by any of the following additional steps:
- drawing a line close to a shape of the real-world object, or phenomenon, on the mobile device screen;
- highlighting the screen area of the real-world object, or phenomenon;
- shadowing the screen area around the real-world object, or phenomenon;
- displaying the contrast borders of the real-world object, or phenomenon;
- placing a picture or a symbol above the real-world object, or phenomenon.

10. The method of claim 1 wherein the social media content contains a data attachment, or attachments, in any combination of following formats:
a text string; a text string in a rich text format; a video; an image; an audio; a text in a hypertext format; a hyperlink; a form of emoji-reaction; a file of any format.

11. The method of claim 1 wherein a social media tool provides an ability to receive an instant access to social media content directly or indirectly relevant to a particular, visually distinctive real-world object, or phenomenon, and/or an ability to interact with this content, a user who created this content, and/or users who have also interacted, and/or will interact, with this content, by pointing a mobile device camera on this real-world object, or phenomenon.

12. The method of claim 1 wherein a social media content has a form of a group messages for private communication, or game interactions, between users, wherein the message of one user is only visible to users from the same closed group of users, and the message of one user may be commented or updated by only users from the same closed group of users, and/or the user is able to join a conversation, thread, or a community, only by interacting with several real-world objects, or phenomena, or social media content that is associated with particular real-world objects, or phenomena.

13. The method of claim 1 wherein a user, using a user interface and a mobile device visual output system, interacts with other users that have also interacted, or will interact in the future, with a social media content or message associated with a particular real-world object, or phenomenon, by exchanging text comments, that may contain or not contain contents of other formats, including, but not limited to, emoji, images, animated images, audio, video, and/or attached files and wherein a social media user receives a status of community member by interacting with particular objects, or phenomena, that have social media content is associated with it, or attached to it.

14. The method of claim 13 wherein users form lasting communities based on similarities of real-world objects, or phenomena, or social media content associated with those particular real-world objects, or phenomena, in a process described in claim 1, that they interact with, and wherein users can form groups based on physical access to the same real-world objects, or phenomena, using a mobile device, and wherein an access to the group can be gained by interacting with a physical object, or phenomenon, from a limited distance using a mobile device.

15. The method of claim 1 wherein social media content or message that is being created by users stays visible and/or interactive for other users for a long period of time, and the period of time for which the social media content or message, that was created by users, stays visible and/or interactive depends on presence and/or frequency of user interactions with this particular content or message; the method further comprises defining time period and displaying the real-world objects, or phenomena, that have a social media content associated with it that had been created within the defined time period.

16. The method of claim 1 wherein social media content or message that is being created by users is being displayed or not displayed to other users according to content display priorities that depend on content relevance, user preferences, user interactions, and/or other factors.

17. The method of claim 1 wherein a social media user is able to access a social media content that is relevant to a particular real-world object, or phenomenon, instantly by pointing a mobile device camera on this real-world object, or phenomenon, and wherein an augmented reality instance, associated with real-world objects, or phenomena, that is permanently accessible for multiple users to create, share, and view Augmented Reality content, is created; wherein a user can use interactions with real-world objects, or phenomena, for navigation through virtual content.

18. The method of claim 17 wherein an access to several pieces of social media that are, or can be, relevant to a particular real-world object, or phenomenon, is being offered to a user who points his/her mobile device camera on this real-world object, or phenomenon.

19. The method of claim 1 wherein a social media user is able to join a conversation, thread, or a community, by interacting with a particular real-world object, or phenomenon, or a social media content that is associated with a particular real-world object, or phenomenon.

20. The method of claim 1 wherein a social media content and/or social media content updates, and/or notifications that are related to social media content that is being displayed to a social media user, is being filtered by his/her proximity to particular real-world objects, or phenomena, with social media content associated with which his/her social network members with attached to which his/her social network members, and/or users who interacted with same social media content pieces he/she interacted with previously, interacted with, and wherein multiple Augmented Reality instances can be created for different groups of users.

21. The method of claim 1 that further comprises detecting geolocation of a user, that belong to a group of users that is related to a particular real-world object or phenomenon, and sending notification to the users in a case if the real-world object, or phenomenon, with the same, or approximately same, geolocation as the user has a message attached to it, or has been interacted otherwise, by another user, wherein the user who belongs to the same group.

22. The method of claim 1 that further comprises viewing social media content, that is associated with or with attached to the real-world object or phenomenon, outside the Augmented Reality, and frames on which social media content is displayed, are being demonstrated on the screen of a mobile device consequently in a form of video that portrays Augmented Reality; the method further comprises the step of navigation among real-world objects, or phenomena, and/or social media content associated with real-world objects, or phenomena, outside Augmented Reality, not using Augmented Reality, and the step of navigation among real-world objects, or phenomena, using the map representation of real-world objects, or phenomena, and/or social-media content associated with those objects, or phenomena, reflected on the map, and wherein messages that are associated with the objects, or with attached to the objects, or phenomena, if user opt so, are reflected on the image of the object, or phenomenon, geolocation even if the object, or phenomenon, is not currently visible to the user.

23. The method of claim 1 wherein a social media user gains functional and/or visual benefits, and/or cosmetic benefits, and/or privileges that are associated with being a person who had physical access to a particular real-world object, or phenomenon, that has a social media content associated with or with attached to, and that he can exercise, while using social media, or otherwise.

24. The method of claim 1 wherein a same social media content can be associated with multiple real-world objects, or phenomena, that are related to one another, visually resemblant, are parts of a single object, or phenomenon, are different states, and/or perspectives, of a single object, or phenomenon, and/or are forming a single scene.

25. The method of claim 1 wherein a user, when pointing a mobile device camera on a real-world object, or phenomenon, is being offered a choice between pieces of social media content that are, or can be, associated with this particular real-world object, or phenomenon, as well as real-world objects, or phenomena, in close proximity that are close to visual similarity or resemblance to this real-world object, or phenomenon, that a user points a mobile device camera at, wherein pieces of social media content that are being offered to a user are sorted by visual similarity or resemblance to the real-world object, or phenomenon, that a user points a mobile device camera at.

26. The method of claim 17 wherein a user can use interactions with real-world objects, or phenomena, for navigation through social media content, or other digital content.

27. A mobile device application that allows users to interact with the real-world objects, or phenomena, and with each other, implementing algorithm described in claim 1.

28. A mobile device application that allows users to interact with the real-world objects, or phenomena, and with each other, implementing algorithm described in claim 2.

* * * * *